United States Patent
Wang et al.

(10) Patent No.: US 11,942,807 B2
(45) Date of Patent: Mar. 26, 2024

(54) RIDING-TYPE MOWER AND CURRENT-LIMITING PROTECTION METHOD THEREOF

(71) Applicant: Nanjing Chervon Industry Co., Ltd., Nanjing (CN)

(72) Inventors: Lei Wang, Nanjing (CN); Dezhong Yang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 557 days.

(21) Appl. No.: 17/156,709

(22) Filed: Jan. 25, 2021

(65) Prior Publication Data
US 2021/0143650 A1    May 13, 2021

Related U.S. Application Data

(63) Continuation of application No. PCT/CN2019/098877, filed on Aug. 1, 2019.

(30) Foreign Application Priority Data

Aug. 1, 2018   (CN) .......................... 201810860510.4

(51) Int. Cl.
*H02J 7/00*   (2006.01)
*A01D 34/00*   (2006.01)
(Continued)

(52) U.S. Cl.
CPC .......... *H02J 7/0016* (2013.01); *A01D 34/006* (2013.01); *A01D 69/02* (2013.01);
(Continued)

(58) Field of Classification Search
CPC .. H02J 7/0016; H02J 7/00304; H02J 7/00306; H02J 2310/22; H02J 2310/40;
(Continued)

(56) References Cited

U.S. PATENT DOCUMENTS

| 2009/0015206 A1* | 1/2009 | Seman, Jr. .......... | H01M 10/482 |
| | | | 320/136 |
| 2010/0304206 A1* | 12/2010 | Nakashima ....... | H01M 10/0525 |
| | | | 29/623.1 |
| 2016/0242356 A1* | 8/2016 | Velderman ........... | A01D 75/006 |

FOREIGN PATENT DOCUMENTS

| CN | 103796504 A | 5/2014 |
| CN | 103944487 A | 7/2014 |

(Continued)

OTHER PUBLICATIONS

CIPO, office action issued on Canadian patent application No. 3,107,893, dated Sep. 7, 2022, 3 pages.

(Continued)

*Primary Examiner* — Nghia M Doan

(74) *Attorney, Agent, or Firm* — Greenberg Traurig, LLP

(57) ABSTRACT

A riding-type mower includes a power supply device and the power supply device includes a plurality of battery packs and a power management module. The plurality of battery packs are detachably mounted to the riding-type mower and further configured to supply electric energy to a hand-held electric power tool. The plurality of battery packs each are provide with at least one battery cell group, and each battery cell group includes a plurality of battery cells electrically connected to each other. The power management module is configured to determine whether the plurality of battery packs satisfy a discharge condition and control a battery pack satisfying the discharge condition to discharge when the battery pack satisfies the discharge condition.

20 Claims, 15 Drawing Sheets

(51) Int. Cl.
*A01D 69/02* (2006.01)
*A01D 101/00* (2006.01)

(52) U.S. Cl.
CPC ...... *H02J 7/00304* (2020.01); *H02J 7/00306* (2020.01); *A01D 2101/00* (2013.01)

(58) Field of Classification Search
CPC ..... H02J 7/0063; A01D 34/006; A01D 69/02; A01D 2101/00; A01D 34/64
See application file for complete search history.

(56) References Cited

FOREIGN PATENT DOCUMENTS

| | | | |
|---|---|---|---|
| CN | 105850340 | A | 8/2016 |
| CN | 107612094 | A | 1/2018 |
| EP | 2793346 | A1 | 10/2014 |
| JP | 5778094 | B2 | 9/2015 |
| WO | 2013/102023 | A1 | 7/2013 |

OTHER PUBLICATIONS

EPO, extended European Search Report issued on European patent publication No. 3827659A1, dated Aug. 24, 2021, 8 pages.
ISA/CN, Int. Search Report issued on PCT application No. PCT/CN2019/098877, dated Oct. 29, 2019, 2 pages.

\* cited by examiner

RIDING-TYPE MOWER AND CURRENT-LIMITING PROTECTION METHOD THEREOF

RELATED APPLICATION INFORMATION

This application claims priority to Chinese patent application No. 201810860510.4 filed Aug. 1, 2018, the disclosure of which is incorporated herein by reference in its entirety.

BACKGROUND

A mower is widely used in the fields of mowing lawns and vegetation. In the related art, the mower generally includes a hand-held mower and a riding-type mower. In the market, the riding-type mower is generally powered by diesel, which not only pollutes the environment, but also requires frequent replacement of vulnerable parts in a fuel system, thus increasing maintenance costs.

SUMMARY

The present application provides a riding-type mower powered by a battery pack and a current-limiting protection method thereof.

One example provides a riding-type mower including a body frame, a seat, a mowing unit, a walking unit, and a power supply device. The seat is disposed on the body frame. The mowing unit includes a mowing element and a first motor configured to drive the mowing element. The walking unit includes a road wheel and a second motor configured to drive the road wheel. The power supply device is mounted on the body frame. The power supply device includes a plurality of battery packs and a power management module. The plurality of battery packs are configured to supply an energy source to the riding-type mower and are detachably mounted to the riding-type mower. The plurality of battery packs are further configured to supply electric energy to a hand-held electric power tool. The plurality of battery packs each are provided with at least one battery cell group, and each battery cell group includes a plurality of battery cells electrically connected to each other. The power management module is configured to determine whether the plurality of battery packs satisfy a discharge condition and control a battery pack satisfying the discharge condition to discharge when the battery pack satisfies the discharge condition. The discharge condition includes that a sum of numbers of respective battery cell groups connected of all the plurality of battery packs in parallel is greater than or equal to 5.

One example provides a current-limiting protection method for the above-mentioned riding-type mower. The current-limiting protection method includes steps described below. An over current protection threshold is preset. A total output current of a power supply device is monitored in real time. Whether the total output current of the power supply device exceeds the over current protection threshold is determined. In response to the output total current exceeding the over current protection threshold, current-limiting protection information is generated. The current-limiting protection information is configured to reduce the total output current of the power supply device to be equal to or less than the over current protection threshold, the current-limiting protection information includes a current distribution rule for a plurality of loads, and each load limits a current of the each load according to received current-limiting protection information.

One example provides a riding-type mower including a body frame, a seat, a mowing unit, a walking unit, and a power supply device. The seat is disposed on the body frame. The mowing unit includes a mowing element and a first motor configured to drive the mowing element. The walking unit includes a road wheel and a second motor configured to drive the road wheel. The power supply device is mounted on the body frame. The power supply device includes a battery pack and a power management module. The battery pack is configured to supply an energy source to the riding-type mower and is detachably mounted to the riding-type mower. The battery pack is further configured to supply electric energy to a hand-held electric power tool. A battery cell group is disposed in the battery pack, and the battery cell group includes a plurality of battery cells electrically connected to each other. The power management module is configured to determine whether the battery pack satisfies a discharge condition and control the battery pack to discharge when the battery pack satisfies the discharge condition. The discharge condition includes that a number of battery cell groups of the battery pack connected in parallel is greater than or equal to five.

One example provides a current-limiting protection method for the above-mentioned riding-type mower. The current-limiting protection method includes steps described below. An over current protection threshold is preset. A total output current of a power supply device is monitored in real time. Whether the total output current of the power supply device exceeds the over current protection threshold is determined. In response to the total output current exceeding the current protection threshold, current-limiting protection information is generated. The current-limiting protection information is configured to reduce the total output current of the power supply device to be equal to or less than the over current protection threshold, the current-limiting protection information includes a current distribution rule for a plurality of loads, and each load limits a current of the each load according to received current-limiting protection information.

DETAILED DESCRIPTION

Figure 1:
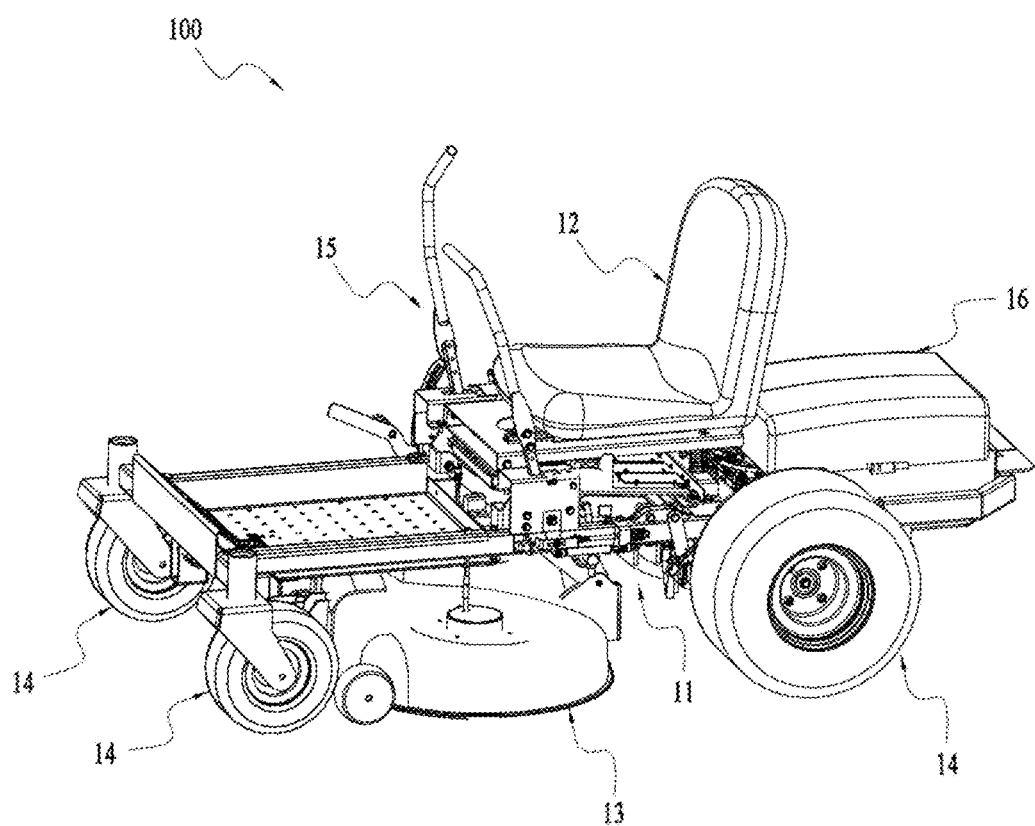
FIG. 1 is a perspective view of a riding-type mower according to one example of the present application.
Figure 2:
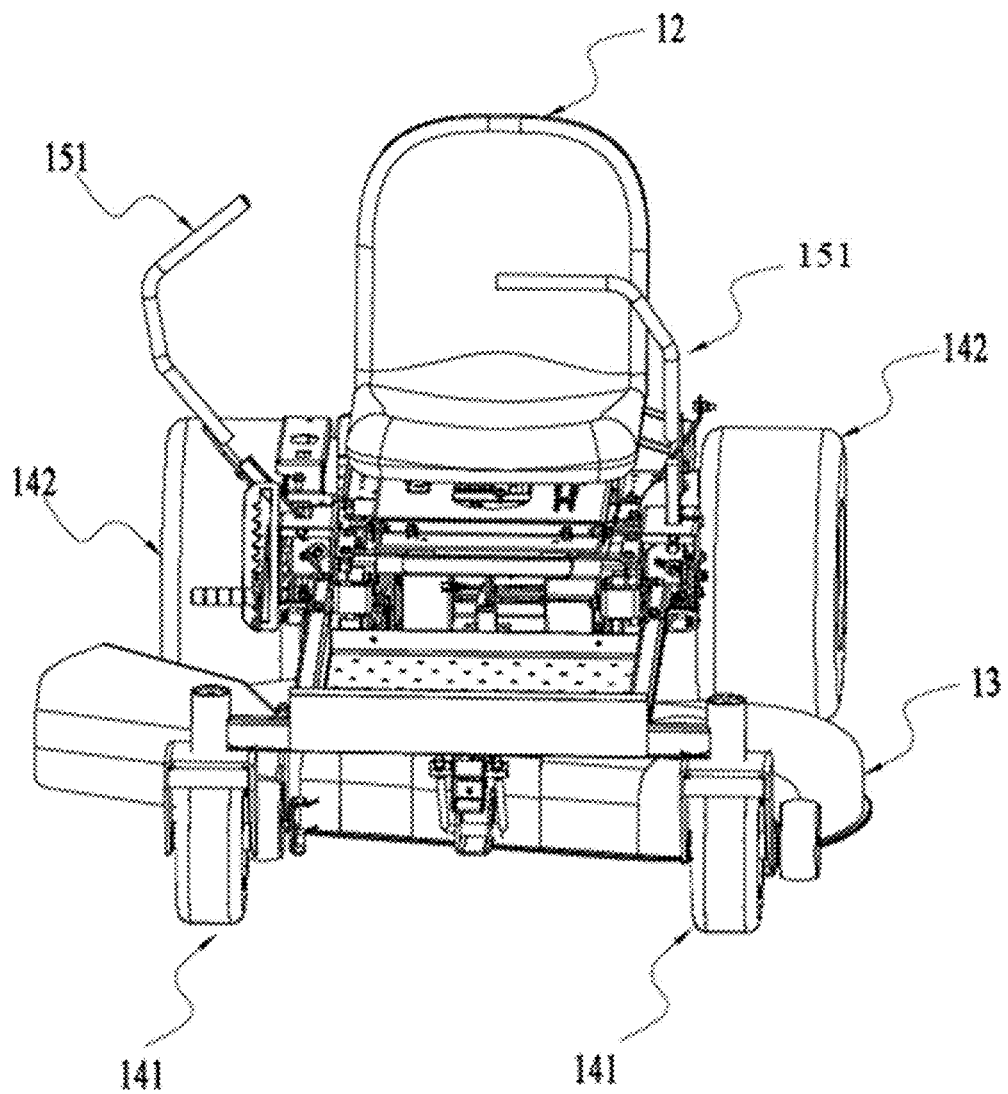
FIG. 2 is a perspective view of a riding-type mower from another perspective according to one example of the present application.
Figure 3:
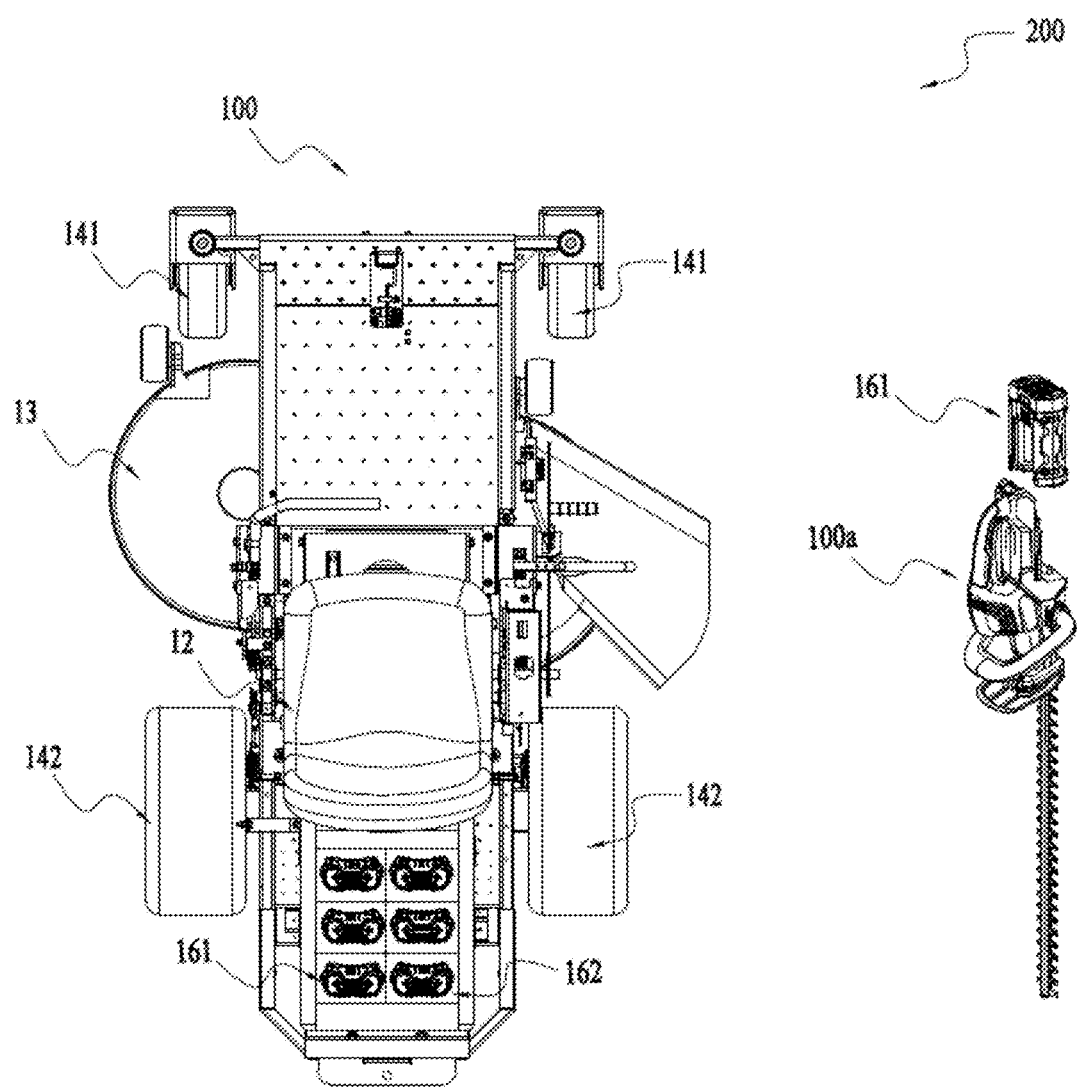
FIG. 3 is an electric power tool system including a riding-type mower according to one example of the present application.

A riding-type mower 100 shown in FIG. 1 to FIG. 3 can be operated by an operator riding on the riding-type mower 100 to mow lawns, vegetation and the like.

The riding-type mower 100 includes a body frame 11, a seat 12, a mowing unit 13, a walking unit 14, an operating device 15, a power supply device 16, and a control unit.

It will be apparent to those skilled in the art that the terms "controller", "control unit", "power management module", "module", "unit" and "processor" may include or relate to at least one of hardware or software.

The body frame 11 is configured to carry the seat 12, and at least a portion of the body frame 11 extends along a direction parallel to a forward and back direction of the frame 11. The seat 12 is configured for the operator sitting, and the seat 12 is mounted on the body frame 11. The forward and back direction refers to a left-right direction in FIG. 1.

Figure 4:
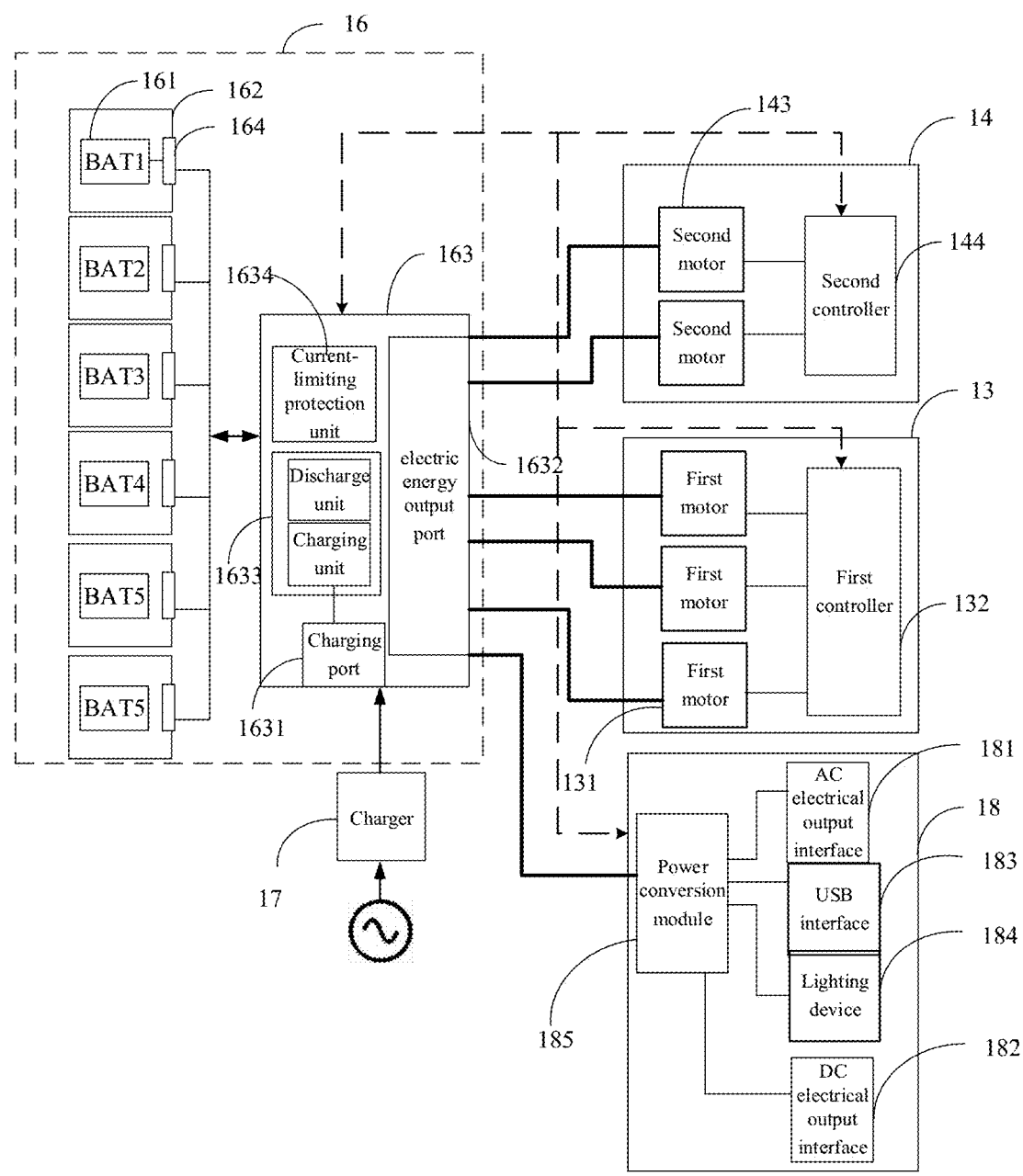
FIG. 4 is a circuit schematic diagram of a riding-type mower according to one example of the present application.

The mowing unit 13 is connected to the body frame 11, and the mowing unit 13 includes a mowing element implementing a mowing function. As shown in FIG. 4, the mowing unit 13 further includes a first motor 131 configured to drive the mowing element to rotate at a high speed. The mowing unit 13 may include more than one mowing element, and correspondingly, a number of first motors 131 may correspond to a number of mowing elements. In this example, the mowing elements are three blades, and three corresponding first motors are provided. In other examples, the mowing unit 13 further includes a first controller 132 controlling the first motor 131.

The walking unit 14 enables the riding-type mower 100 to walk on, i.e., move over, the lawn. As shown in FIG. 2 and FIG. 3, the walking unit 14 includes a road wheel, the road wheel includes a first road wheel 141 and a second road wheel 142, and the above-mentioned mowing unit 13 is disposed between the first road wheel 141 and the second road wheel 142. Two first road wheels 141 are provided, and two second road wheels 142 are further provided. As shown in FIG. 4, the walking unit 14 further includes a second motor 143, and the second motor 143 is configured to drive the second road wheels 142. Two second motors are further provided. When the two second motors 143 drive corresponding second walking wheels 142 to rotate at different rotational speeds, a speed difference occurs between the two second road wheels 142, thereby causing the riding-type mower 100 to veer. In other examples, the walking unit 14 further includes a second controller 144 controlling the second motor 143.

The operating device 15 is configured to be operated by a user so as to control a walking and mowing action of the riding-type mower 100. As shown in FIG. 2, the operating assembly 15 may include a first operating assembly 151 and a second operating assembly. The first operating assembly 151 is configured to be operated by the user so as to start the second motor 143 in the walking unit 14, thereby controlling the riding-type mower 100 to walk on the lawn. The two first operating assemblies 151 are provided, and in this example, the two first operating assemblies 151 control the two corresponding second motors 143, respectively. The second operating assembly is configured to be operated by the user so as to start the first motor 131 in the mowing unit 13, thereby controlling the mowing element to mow.

As shown in FIG. 3, the power supply device 16 includes at least one battery pack 161, the at least one battery pack 161 is configured to supply an energy source to the riding-type mower 100, and the at least one battery pack 161 is further configured to supply the energy source to another electric power tool. At least one battery cell group is disposed in the battery pack 161, and the battery cell group includes a plurality of battery cells electrically connected to each other. In one example, the battery cell may be a lithium battery cell.

The battery pack 161 can be detached from the body frame 11 by the user. The electric power tool system 200 shown in FIG. 3 includes the riding-type mower 100 and a hand-held electric power tool 100a. The battery pack 161 in the power supply device 16 that supplies power to the riding-type mower 100 can be detached from the riding-type mower 100 and mounted to the hand-held electric power tool 100a, such that the battery pack 161 can further supply the energy source to the hand-held electric power tool 100a. That is to say, the battery pack 161 in the power supply device 16 of the present application can be applied to not only the riding-type mower 100, but also other hand-held electric power tools 100a, thereby improving the adaptability of the battery pack 161 and the ability of the riding-type mower 100 adapting to the battery pack 161.

In one example, the hand-held electric power tool 100a may be a garden tool such as a grass trimmer, a pruner, or a blowing machine; a torque output tool such as an electric drill or an electric hammer; a saw-type tool such as an electric circular saw, a turning saw, or a reciprocating saw; or a grinding-type tool such as an angle grinder, or a sander. In other examples, the battery pack 161 is further configured to supply power to a hand-pushing electric power tool, such as a hand-pushing mower or a hand-pushing snow sweeper.

In one example, a number of battery packs is greater than or equal to four and less than or equal to ten. A weight of a single battery pack is less than or equal to 4 KG. The advantage is that requirement of larger output power or larger output current of the riding-type mower 100 is satisfied and the whole riding-type mower 100 will not appear cumbersome.

In one example, discharge power of the power supply device 16 ranges from 2 KW to 4 KW.

In one example, discharge power of a single battery pack 161 ranges from 500 W to 6500 W.

In one example, a capacity of a single battery pack 161 is greater than or equal to 130 Wh and less than or equal to 1000 Wh.

As shown in FIG. 3, the power supply device 16 further includes a battery compartment 162 for mounting the battery pack 161, and the power supply device 16 may include a plurality of battery compartments 162. For example, in this example, the power supply device 16 includes six battery compartments 162, and the six battery compartments 162 are all disposed at one end of the seat 12 facing away from the first road wheel 141. Correspondingly, the power supply device 16 includes six battery packs 161, and the six battery packs 161 can be installed in the six corresponding battery compartments 162, respectively. As shown in FIG. 4, each battery compartment 162 is provided with a battery pack port 164, and the battery pack port 164 is configured to electrically access the respective battery pack 161. In one example, the battery pack port 164 includes a communication terminal, and the communication terminal of the battery pack port 164 is configured to be connected to a communication terminal of the battery pack 161 so as to transmit a communication signal. In one example, the six battery compartments 162 may also be formed by a single battery compartment with a larger size. That is to say, the power supply device 16 includes only one battery compartment 162, and the plurality of battery packs 161 are all installed in the one battery compartment 162. In this case, the one battery compartment 162 includes six battery pack ports 164, and the six battery pack ports 164 are correspondingly connected to the six battery packs 161, respectively. Alternatively, the power supply device 16 may include only one battery compartment 162, and correspondingly, the power supply device 16 may also include one battery pack 161. That is to say, a number of battery compartments 162 and a number of battery packs 161 are not specifically limited, and the corresponding relation between the battery compartments 162 and the battery packs 161 is not limited to a one-to-one correspondence, but a number of battery pack ports 164 should correspond to a maximum number of the accessed battery packs 161.

Referring to FIG. 4, the power supply device 16 further includes a power management module 163, and the power management module 163 can be electrically connected to the battery pack port 164 of each battery compartment 162. The power management module 163 is configured to perform charge management or discharge management on an electrically accessed battery pack 161. In one example, the power management module 163 relates to at least one of software or hardware.

The power management module 163 may perform charge management or discharge management on one electrically accessed battery pack 161, or perform charge management or discharge management on two or more electrically accessed battery packs 161, or perform charge management and discharge management on two or more electrically accessed battery packs 161; or perform charge management or discharge management on one or more battery packs in a plurality of battery packs 161 which are electrically accessed. In one example, the power management module 163 includes a charging port 1631, an electric energy output port 1632, and a controller 1633.

As shown in FIG. 4, the charging port 1631 is configured to be electrically connected to a charger 17 so as to charge a battery pack 161 electrically connected to the power management module 163. In one example, an electric energy input port is disposed outside the riding-type mower 100, and an output interface of the charger 17 may be electrically connected to the charging port 1631 through an external cable or the output interface of the charger 17 may be electrically connected to the charging port 1631 in direct.

For example, the output interface of the charger 17 is electrically connected to the charging port 1631 in a plug-and-unplug mode. In other examples, the charging port 1631 may be disposed inside the riding-type mower 100, and the charger 17 may also be built in the riding-type mower 100. In this case, the output interface of the charger 17 and the charging port 1631 are both disposed inside the riding-type mower 100, and the output interface of the charger 17 is electrically connected to the charging port 1631 through internal wires.

The electric energy output port 1632 is configured to output electric energy of the battery pack 161 to other electronic assemblies or external devices of the riding-type mower 100 so as to provide electric energy to the other electronic assemblies or external devices. For example, in this example, the electric energy output port 1632 is configured to supply the electric energy of the battery pack 161 to the first motor 131 and the first controller 132 of the mowing unit 13 and to the second motor 143 and the second controller 144 of the walking unit 14.

The electric energy output port 1632 is further configured to output the electric energy of the battery pack 161 to an auxiliary function module 18, and the auxiliary function module 18 is configured to provide an auxiliary function of the riding-type mower 100. The auxiliary function module 18 may include a power conversion module 185, at least one alternating current (AC) electrical output interface 181, at least one direct current (DC) electrical output interface 182, at least one universal serial bus (USB) interface 183, a lighting device 184. The power conversion module 185 is configured to convert electric energy from at least one battery pack 161 into electric energy which can be used by external devices. The AC electrical output interface 181 may output 220V three-phase alternating current, the DC electrical output interface 182 may output 12V/25W direct current, and the USB interface may charge an electronic device (such as a mobile phone) having a USB interface. In one example, the auxiliary function module 18 may further include other function modules. In one example, the power conversion module 185 may also be integrated into the power management module 163.

As shown in FIG. 4, the controller 1633 of the power management module 163 includes a charging unit and a discharge unit. The charging unit enables the charger 17 to charge the battery pack 161 electrically connected to the power management module 163. In one example, the charging unit includes a charging input end, a charging output end, and an electronic switch. The charging input end of the charging unit is electrically connected to the charging port 1631, and the charging output end of the charging unit is electrically connected to the battery pack port 164. In one example, the charging input end of the charging unit is the charging port 1631. In one example, the charging output end of the charging unit is the battery pack port 164. The charging input end of the charging unit and the charging output end of the charging unit can achieve electrical connection between the battery pack 161 and the charger 17. The electronic switch includes two contact ends and one enabled end, the two contact ends are connected in series between the charging input end and the charging output end, the enabled end is connected to the controller 1633, and the enabled end is configured to receive a control signal from the controller 1633 so as to control on and off of the electronic switch. In one example, the electronic switch is a relay. In other examples, the electronic switch is a power switching tube. When the electronic switch is turned on, an electrical connection between the charging port 1631 and the battery pack port 164 is established so as to enable the charger 17 to charge the accessed battery pack 161 through the charging unit. When the electronic switch is disconnected, the electrical connection between the charging port 1631 and the battery pack port 164 is disconnected, and at this time, the charger 17 cannot charge the accessed battery pack 161 through the charging unit.

In one example, an input end of the discharge unit is electrically connected to the battery pack port 164, and an output end of the discharge unit is electrically connected to the electric energy output port 1632. In one example, the input end of the discharge unit is the battery pack port 164 such that the battery pack port 164 is electrically connected to the discharge unit. In other examples, the input end of the discharge unit is electrically connected to the battery pack port 164 such that the battery pack 161 is electrically connected to the discharge unit. In one example, the discharge unit includes an electronic switch, the electronic switch includes two contact ends and one enabled end, the two contact ends are connected in series between the input end of the discharge unit and the output end of the discharge unit, the enabled end is electrically connected to the controller 1633, and the enabled end is configured to receive a control signal from the controller 1633 so as to control the on and off of the electronic switch. In one example, the electronic switch is a relay. In other examples, the electronic switch is a power switching tube.

The controller 1633 of the power management module 163 is configured to control the charging unit and the discharge unit and can further achieve coordinated management of the plurality of battery packs 161. For example, a plurality of accessed battery packs 161 with a larger voltage difference are coordinated and managed so as to prevent cross-charging between the plurality of battery packs 161 when the voltage difference is relatively large, or battery packs 161 satisfying a charging and discharge condition are selected for charging control or discharging control. The controller 1633 of the power management module 163 is further configured to process data, output a control signal, and the like.

In the above-mentioned examples of the present application, the riding-type mower 100 controls current distribution between at least two loads through the controller 1633, and the at least two loads include the mowing unit 13 and the walking unit 14. The mowing unit 13 includes the first motor 131, and the walking unit includes the second motor 143. The controller 1633 of the power management module 163 controls a working current of the first motor 131 of the mowing unit 13 during the mowing operation of the mowing unit 13 and a working current of the second motor 143 of the walking unit 14 during the walking of the walking unit 14.

Figure 9:
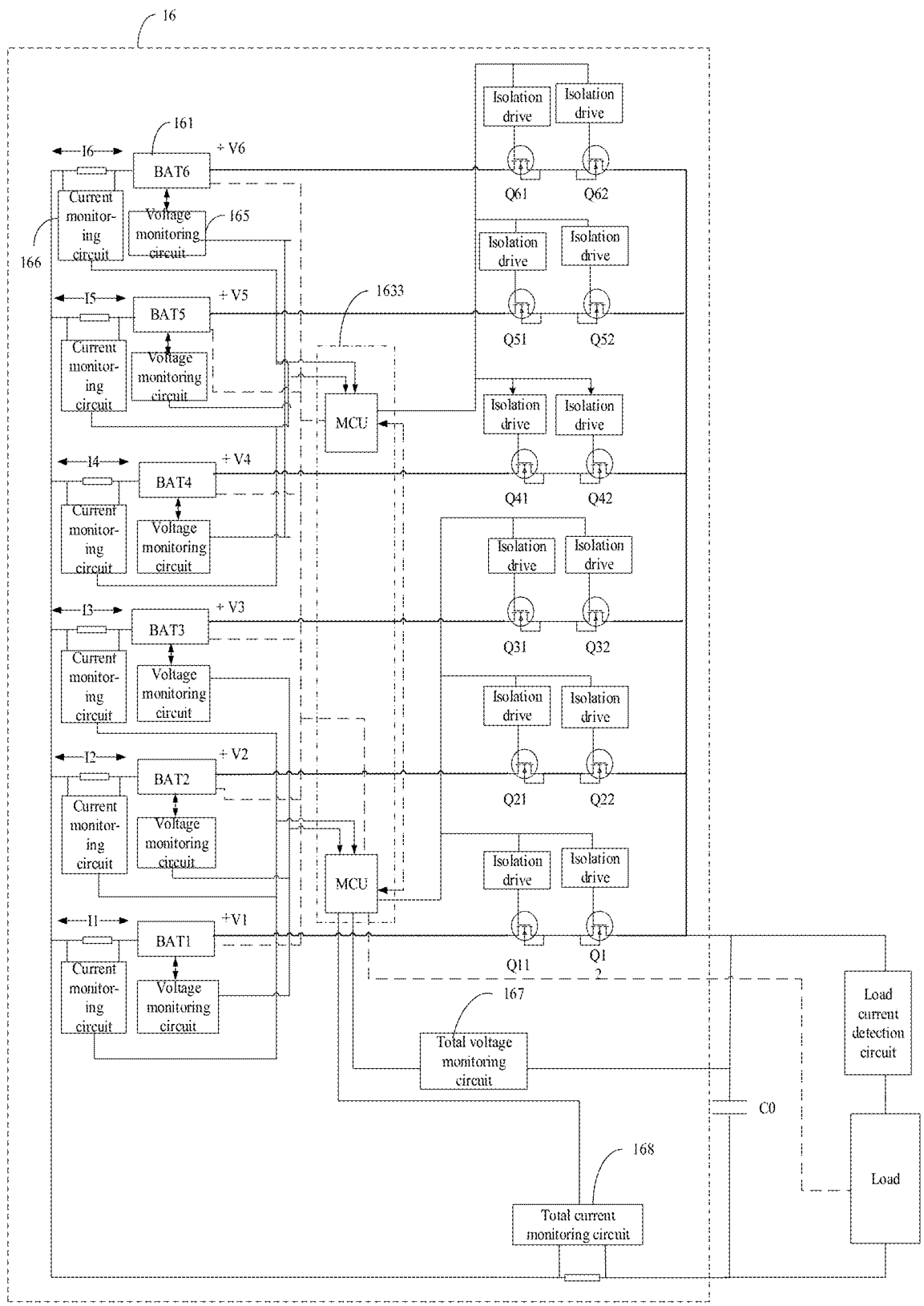
FIG. 9 is a schematic diagram of a discharge circuit of a power supply device of a riding-type mower according to one example of the present application.

In one example, the power supply device 16 may further include a detector or a monitoring circuit, and the detector or the monitoring circuit is configured to detect a physical parameter or an electrical parameter of the battery pack 161 during the battery pack 161 charging or discharging. For example, as shown in FIG. 9, a voltage monitoring circuit 165 of each battery pack 161 is configured to detect a voltage of each battery pack 161. A total voltage monitoring circuit 167 is configured to monitor a total voltage output by the power supply device 16. A current detection circuit 166 associated with each battery pack 161 is disposed on each battery pack circuit, and the current detection circuit 166 is configured to detect a charging current or a discharge current of each battery pack 161. A total current monitoring circuit 168 is configured to monitor a total current output by the power supply device 16. A temperature detection circuit in the power supply device 16 is configured to detect an internal temperature of each battery pack 161 or a temperature of each battery compartment 162. In one example, the power management module 163 may further include a battery capacity detection unit, and the battery capacity detection unit is configured to detect a battery capacity or a capacity of each battery pack 161 inserted into the battery compartment 162. In this example, the power management module 163 is connected to each load in a bus mode.

As will be appreciated by those skilled in the art, the controller 1633 of the power management module 163 may include at least one processor or controller. In one example, the processor is a microprocessor (MCU).

In one example, the controller 1633 may include only one processor or controller, and all battery packs 161 share the one processor or controller. The processor or controller is configured to control an indicator state of each battery pack 161 and the electronic switch on a charging and discharging circuit according to information of each battery pack 161, such as a voltage, a current, a temperature, and SOC.

In one example, the controller 1633 may include a plurality of processors or controllers, and a number of the processors is less than a number of the battery compartments 162. For example, for six battery packs 161, three battery packs 161 of the six battery packs 161 share one processor or controller, and there are two processors or controllers in total.

In other examples, the controller 1633 includes processors or controllers, and a number of the processors or controllers is the same as a number of the battery compartments 162. Each battery pack 161 has a respective processor or controller, and the processor or the controller is configured to control an indicator state of the corresponding battery pack 161 and a plurality of electronic switches on a circuit of the corresponding battery pack 161 according to information of a corresponding battery pack 161, such as a current, a voltage, a temperature, and SOC.

The controller 1633 may include a plurality of processors or controllers, and the plurality of processors or controllers may communicate and exchange respective information with each other. In this way, the plurality of processors or controllers can obtain state information and the like of all the battery packs 161, so as to better achieve the coordinated management of charging and discharging of all the battery packs 161.

In one example, one processor or controller may further be selected as a host, and the host is configured to collect and process information of other processors or controllers (including current status information of each battery pack 161) so as to coordinate and manage the plurality of processors or controllers. The host is further configured to transmit status information of the power supply device 16 or the plurality of battery packs 161 to an external apparatus (such as a display screen).

One or more electronic switches are disposed in series on each battery pack circuit, and a control end of the electronic switch is electrically connected to a processor or controller of a corresponding battery pack 161 so as to receive a control signal from the corresponding processor or controller. In this way, in a charging process of the battery pack 161, the electronic switch allows a charging current to flow into the battery pack 161 or prohibits a charging current from flowing into the battery pack 161; and in a discharge process of the battery pack 161, the electronic switch allows or prohibits a discharging current from the battery pack 161. In one example, the electronic switch is a metal oxide semiconductor (MOS) tube.

In this example, the power management module 163 can coordinate and manage the plurality of battery packs 161 in the power supply device 16 such that at least two battery packs 161 can jointly discharge to provide sufficient electric energy for the riding-type mower 100.

The power management module 163 is configured to determine whether the battery pack 161 satisfies a discharge condition and control a battery pack 161 satisfying the discharge condition to discharge when the battery pack 161 satisfies the discharge condition. The discharge condition includes that a sum of numbers of respective battery cell groups of all battery packs 161 connected in parallel is greater than or equal to five. In this way, a case that a current tolerated by each battery cell in the battery pack 161 being discharged exceeds a current of the battery pack 161 that can safely discharge due to larger output power or output current required by the riding-type mower 100 can be avoided. If the current tolerated by each battery cell exceeds the current of the battery pack 161 that can safely discharge, not only a service life of the battery pack 161 will be affected, but also safety problems will be caused. Moreover, a total parallel number of battery packs 161 in the power supply device 16 participating in discharge needs to be greater than or equal to five so as to ensure sufficient output power while improving the safety of the discharge process.

For ease of description, a parallel number of the battery pack 161 is defined firstly. The parallel number of the battery pack 161 is a number of battery cell groups in the battery pack 161 connected in parallel, and the parallel number is expressed as a symbol P. A single battery pack 161 having a number n of internal battery cell groups connected in parallel may be referred to as an nP battery pack. For example, a 2P battery pack means that the number of battery cell groups in the battery pack connected in parallel is two. When the plurality of battery packs 161 are connected in parallel, the sum (that is, a total parallel number) of the battery cell groups of battery packs 161 connected in parallel is a sum of parallel numbers of respective battery cell groups of the battery packs 161, and the total parallel number is expressed as a symbol $P_{total}$. For example, when a 1P battery pack 161, a 2P battery pack 161, and a 3P battery pack 161 are connected in parallel, the sum of numbers of battery cell groups of all the battery packs 161 connected in parallel $P_{total}$=1P+2P+3P=6P. For ease of description, the total parallel number $P_{total}$ of battery packs in the present application is the sum of the number of all battery cell groups connected in parallel.

According to the above-mentioned definition, when one 1P battery pack 161 and one 3P battery pack 161 are connected in parallel, or two 2P battery packs 161 are connected in parallel, the total parallel number $P_{total}$ is equal to four. At this time, the above-mentioned parallel number condition is not satisfied, and the power supply device 16 will not discharge.

In the present application, a number of battery packs 161 in the power supply device 16 satisfying the discharge condition may be one, two or more. In a case where the number of battery packs 161 satisfying the discharge condition is one, the number of internal battery cell of the battery packs 161 groups connected in parallel satisfying the discharge condition is greater than or equal to five. In a case where the number of battery packs 161 satisfying the discharge condition is two or more, the sum of numbers of battery cell groups of all battery packs 161 connected in parallel is greater than or equal to five. For example, when a 1P battery pack 161, a 2P battery pack 161, and a 3P battery pack 161 are connected in parallel, the sum of numbers of battery cell groups of all the battery packs 161 connected in parallel is six. As described above, when the sum of the numbers of battery cell groups of the battery packs 161 connected in parallel in the power supply device 16 satisfying the discharge condition is less than 5, the power supply device 16 will not discharge.

In a case where the number of battery packs 161 satisfying the discharge condition is two or more, the battery cell groups of the battery packs 161 satisfying the discharge condition have a same rated voltage. In this way, when the plurality of battery packs 161 are discharged at the same time, the battery cell groups of the battery packs 161 can be prevented from being overdischarged due to insufficient electric power, thus damaging the battery pack 161.

In one example, a number of battery cells in each battery cell group may be equal or not equal.

That is to say, the power supply device 16 may include only one battery pack 161, and the number of battery cell groups of the battery pack 161 connected in parallel is greater than or equal to five. The power supply device 16 may also include at least two battery packs 161, and the sum of numbers of battery cell groups of the respective battery packs 161 connected in parallel is greater than or equal to five.

In this example, the battery pack 161 inserted into the battery compartment 162 must be in an operational state, that is, the battery pack 161 has no abnormalities. For example, the battery pack 161 does not have an abnormal condition that the battery pack 161 cannot work normally due to factors such as over-temperature or imbalance, that is, the battery pack 161 is in the operational state such that the battery pack 161 can be discharged and the safety of discharge can be ensured.

The discharge condition further includes that a temperature of the battery pack 161 is less than a preset temperature threshold. In one example, when the temperature of the battery pack 161 is greater than or equal to the preset temperature threshold, the power management module 163 controls the battery pack 161 to discharge after waiting for the temperature of the battery pack 161 is changed to be less than the preset temperature threshold.

In a discharge process of the power supply device 16, when a discharge current of any one battery pack 161 is greater than a preset current threshold, the power management module 163 controls the battery packs 161 to stop discharging. In one example, a value of the preset current threshold ranges from 40 A-60 A.

In a discharge process of the power supply device 16, when a voltage difference of each battery cell in any one battery pack 161 is greater than a preset voltage difference threshold, the power management module 163 controls the battery packs 161 to stop discharging, that is, when voltages of internal battery cells of the battery pack 161 are unbalanced, the power management module 163 controls the battery packs 161 to stop discharging.

When the power supply device 16 includes only one battery pack 161, when the battery pack 161 satisfies the discharge condition, the power management module 163 may control the battery pack 161 to discharge.

When at least two battery packs 161 satisfy the discharge condition, the at least two battery packs 161 can together discharge only when voltages of the at least two battery packs 161 are equal or substantially equal, that is, only when a voltage difference of the at least two battery packs 161 is within a preset range can the at least two battery packs 161 jointly discharge. In this example, the voltages of the at least two battery packs 161 being equal refers to that a voltage difference between every two battery packs in the plurality of battery packs 161 is less than the preset voltage difference threshold, and the preset voltage difference threshold may be 2V, 1V, or the like. The joint discharge of the at least two battery packs 161 ensures that a current in a discharge loop of each battery pack 161 does not exceed a safe current value that the battery pack 161 can tolerate. The advantage is that an output current of the riding-type mower 100 can be prevented from being too large. If only one battery pack 161 discharges within a preset period of time, a discharge current in the discharge loop of the battery pack 161 is bound to be very large and may exceed the safe current value that the discharge loop of the battery pack 161 can tolerate, thus not only affecting the service life of the battery pack 161, but also causing safety accidents. Only the voltages of the at least two battery packs being equal or substantially equal is satisfied, the at least two battery packs can jointly discharge, that is, if the voltage difference value is within the preset range, the phenomenon of reverse current that a high-voltage battery pack 161 charges a low-voltage battery pack 161 due to the large voltage difference between battery packs 161 connected in parallel and the parallel discharge of the battery packs 161 at the same time can be avoided, which is not conducive to the normal discharge of the battery pack 10 and the normal operation of the riding-type mower 100.

In the power supply device 16 having two or more battery packs 161, a plurality of battery packs 161 with an equal or substantially equal voltage may be provided, that is, the voltage difference of the plurality of battery packs 161 is within the preset range. The plurality of battery packs 161 with an equal or substantially equal voltage are defined as one battery pack unit, a plurality of battery packs 161 with a same uniform voltage are defined as one battery pack unit, and the one battery pack unit has one uniform voltage. In this way, the one battery pack unit has at least two battery packs 161. A single battery pack 161 may also be defined as one battery pack unit, the one battery pack unit has only one battery pack 161, and a uniform voltage of the battery pack unit may be defined as a voltage of the battery pack 161. In this example, if a plurality of battery pack units having different uniform voltages are provided, that is, when at least two battery pack units are provided, a method of the power management module 163 controlling the at least two battery pack units to jointly discharge includes steps described below. Battery packs 161 with an equal or substantially equal voltage are grouped into one battery pack unit, that is, battery packs 161 where a voltage difference between the battery packs is within the preset range is grouped into one battery pack unit. The battery pack units sequentially discharge according to a voltage level sequence of the battery pack units from highest to lowest until all battery pack units jointly discharge finally.

In the discharge process of the power supply device 16, the voltage monitoring circuit 165, a temperature monitoring circuit, and the current detection circuit 166 which are correlated with each battery pack 161 monitor the temperature of each battery pack 161, the voltage of each battery pack 161, the current of a single battery pack circuit, and a switching tube on each battery pack circuit in real time. If the battery pack 161 has an abnormal state such as overtemperature, overcurrent of a battery pack circuit, or internal cell voltage imbalance in the discharge process, the power management module 163 enables the battery pack 161 to stop working and removes the battery pack 161 from a discharge battery pack queue, such that the battery pack 161 exits a discharge state without affecting the operation of the whole machine.

In one example, in order to ensure that the riding-type mower 100 can have at least some power to complete the remedial work, such as braking or returning to the base, when the parallel number of battery packs 161 is less than a preset parallel number, even if a battery pack 161 has abnormal conditions, the battery pack 161 will not be removed.

Figure 5:
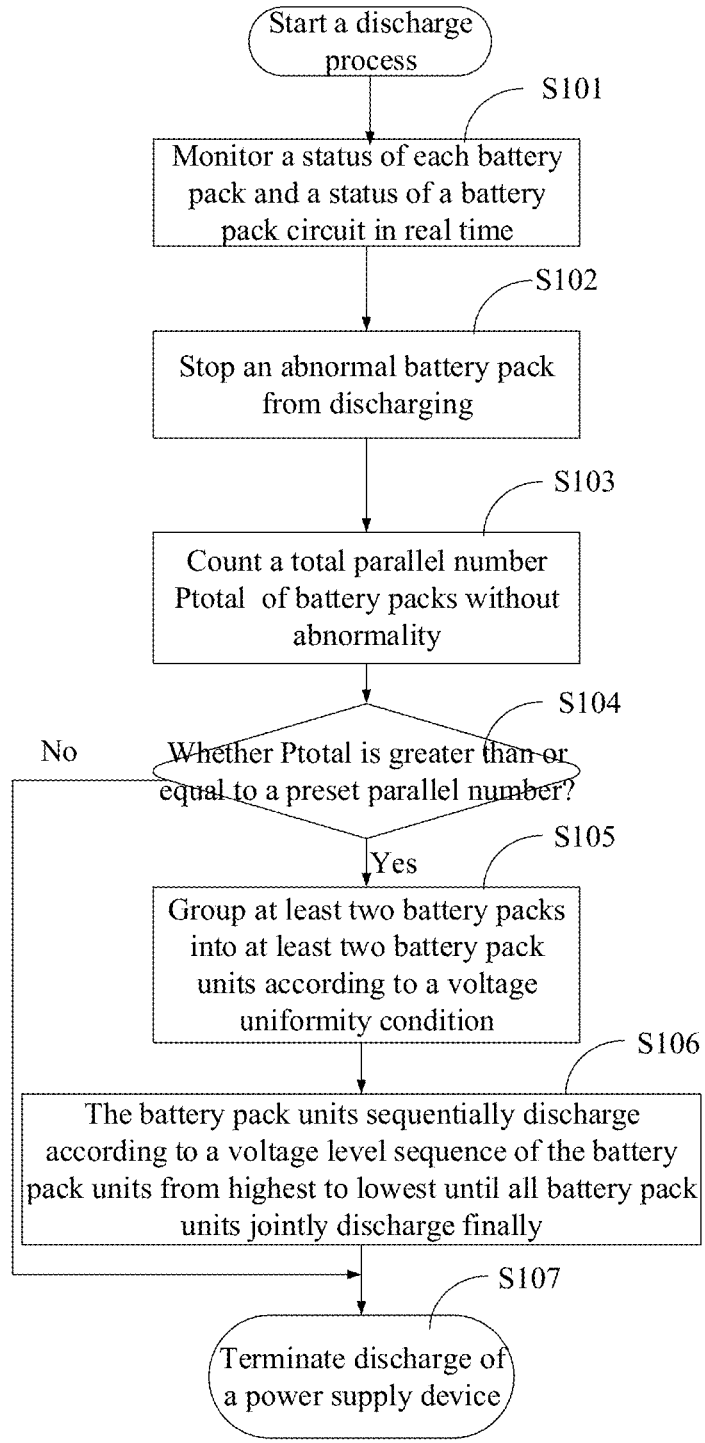
FIG. 5 is a flowchart of a discharge method of a power supply device of a riding-type mower according to one example of the present application.

Referring to FIG. 5, FIG. 5 illustrates a discharge method of the power supply device of the riding-type mower 100, and the method includes steps described below.

In step S101, a status of a battery pack and a status of a battery pack circuit in each battery compartment 162 are monitored in real time.

For example, whether a voltage of the battery pack 161, a temperature of the battery pack 161, a discharge current of a single battery pack circuit and a temperature of a MOS tube of the battery pack circuit appear abnormalities is monitored. If the battery pack 161 inserted into the battery compartment 162 is overheated or unbalanced, a discharge current of a single-path battery pack is greater than an over current protection threshold (such as 50 A) or a duration of the discharge current of the single-path battery pack being greater than the over current protection threshold (such as 50 A) is greater than a preset duration (such as 30 s), or the MOS of the circuit of the battery pack circuit is overheated, it is determined that the battery pack 161 is in an abnormal state or an inoperative state.

In step S102, the battery pack in the abnormal state is stopped from discharging.

When a battery pack in the abnormal state is detected, the power management module 163 stops the battery pack 161 in the abnormal state from discharging. In other examples, in the discharge process, if an abnormality occurs in the battery pack 161, the power management module 163 controls all the battery packs 161 to stop discharging, removes the abnormal battery pack 161 from the discharge queue, and re-performs discharge control on other battery packs 161 satisfying the discharge condition according to the above-mentioned method.

In step S103, a total parallel number $P_{total}$ of battery packs without abnormality is counted.

As described above, the total parallel number $P_{total}$ of the plurality of battery packs 161 is a sum of parallel numbers of the respective battery packs 161, and the parallel number P of each battery pack 161 is the number of interior battery cells in the each battery pack 161 connected in parallel. For example, when a 1P battery pack 161, a 2P battery pack 161, and a 3P battery pack 161 are connected in parallel, the total parallel number $P_{total}$=1P+2P+3P=6P.

Figure 7:
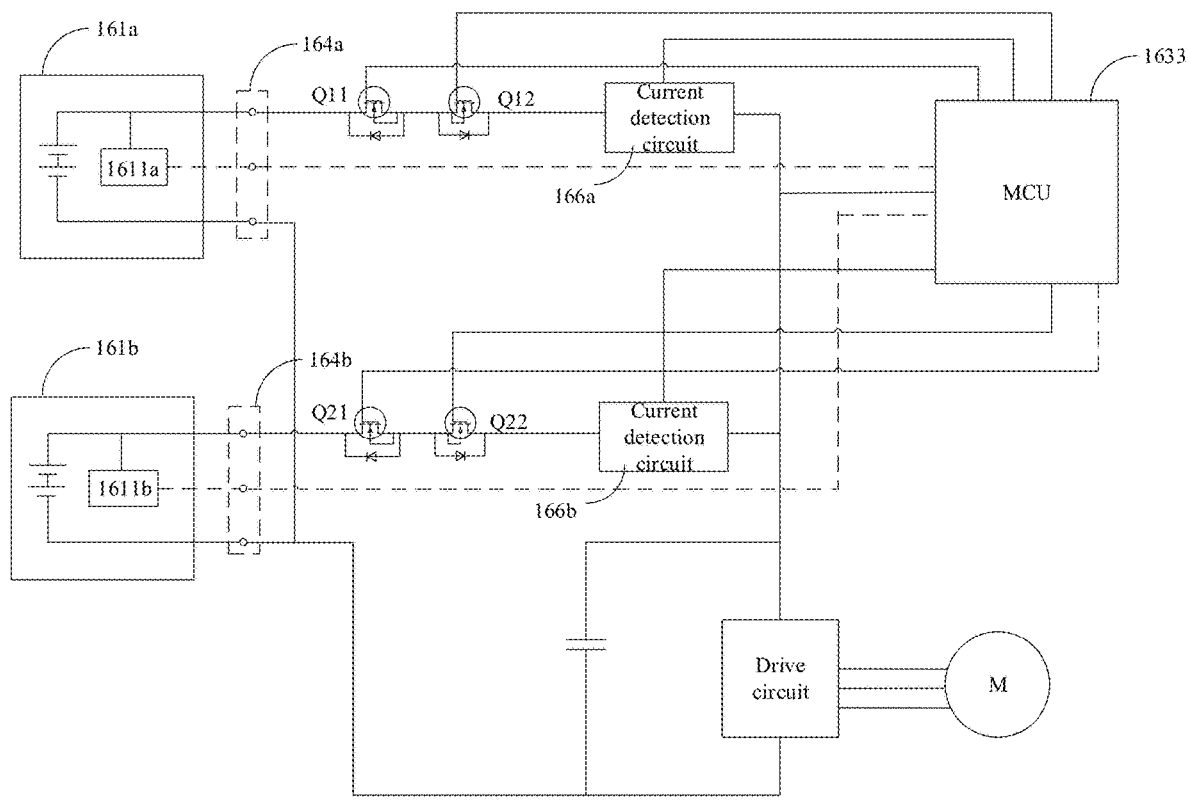
FIG. 7 is a schematic diagram of a discharge circuit of a power supply device of a riding-type mower according to one example of the present application.

Assuming that the parallel number P of each battery pack 161 is 2 and all of the six battery packs 161 have no abnormalities, then the total parallel number of battery packs 161 without abnormalities in FIG. 7 is $P_{total}$=2*6=12.

In step S104, whether $P_{total}$ is greater than or equal to the preset parallel number is determined.

In one example, the preset parallel number is set to 5. If the total parallel number $P_{total}$ of the battery packs 161 without abnormality is greater than or equal to 5, step S105 is turned to. If the total parallel number $P_{total}$ of the battery packs 161 without abnormality is less than 5, step S107 is turned to, and the discharge of the power supply device 16 is terminated. The preset parallel number P herein may also be other values, as long as an actual output current of each battery cell is matched with factory characteristics of the battery cell and the discharge current of each battery cell is within a safe current range that the battery cell can tolerate.

In step S105, the at least two battery packs 161 are grouped into at least two battery pack units according to a voltage uniformity condition.

Still referring to FIG. 4, assuming that a first battery pack BAT1, a second battery pack BAT2 and a third battery pack BAT3 satisfy the voltage uniformity condition and the uniform voltage is 40V, a fourth battery pack BAT4 and a sixth battery pack BAT6 satisfy the voltage uniformity condition and the uniform voltage is 50V, and a voltage of a fifth battery pack BAT5 is 45V, then, the first battery pack BAT1, the second battery pack BAT2 and the third battery pack BAT3 are grouped into one group, that is, a first battery pack unit, and a voltage of the first battery pack unit is 40V; similarly, the fourth battery pack BAT4 and the sixth battery pack BAT6 are grouped into one group, that is, a second battery pack unit; the fifth battery pack BAT5 may be formed into one group, that is, a third battery pack unit (this battery pack unit has only one battery pack), and a voltage of the third battery pack unit is 45V.

In step S106, the battery pack units sequentially discharge according to the voltage level sequence of the battery pack units from highest to lowest until all battery pack units jointly discharge finally.

The power supply device 16 shown in FIG. 4 is described as an example, and the plurality of battery pack units are sorted according to the voltage level sequence from highest to lowest as follows: the second battery pack unit>the third battery pack unit>the first battery pack unit.

In one example, the controller 1633 of the power management module 163 outputs a control signal to the battery packs 161 of the second battery pack unit, that is, the fourth battery pack BAT4 and the sixth battery pack BAT6, such that the fourth battery pack BAT4 and the sixth battery pack BAT6 jointly discharge. After the fourth battery pack BAT4, the sixth battery pack BAT6 of the second battery pack unit and the fifth battery pack BAT5 of the third battery pack unit satisfy the voltage uniformity condition, the controller 1633 of the power management module 163 outputs a control signal to the fourth battery pack BAT4, the fifth battery pack BAT5, and the sixth battery pack BAT6 such that the fourth battery pack BAT4, the fifth battery pack BAT5, and the sixth battery pack BAT6 jointly discharge. After the fourth battery pack BAT4, the fifth battery pack BAT5, the sixth battery pack BAT6 and the first battery pack BAT1, the second battery pack BAT2, and the third battery pack BAT3 of the first battery pack unit satisfy the voltage uniformity condition, the controller 1633 of the power management module 163 outputs a control signal to the first battery pack BAT1, the second battery pack BAT2, the third battery pack BAT3, the fourth battery pack BAT4, the fifth battery pack BAT5, and the sixth battery pack BAT6, such that the first battery pack BAT1, the second battery pack BAT2, the third battery pack BAT3, the fourth battery pack BAT4, the fifth battery pack BAT5, and the sixth battery pack BAT6 jointly discharge, thereby finally achieving joint discharge of the six battery packs. According to this mode, a discharge sequence of the plurality of battery packs in FIG. 4 is BAT4 and BAT6→BAT4, BAT5 and BAT6→BAT1, BAT2, BAT3, BAT4, BAT5 and BAT6.

In this example, when the plurality of battery packs 161 are grouped into one battery pack unit according to the voltage uniformity condition, the plurality of battery packs 161 discharge at the same time.

In step S107, the discharge of the power supply device 16 is terminated.

In the discharge process, when a battery pack 161 is inserted or pulled out, the discharge control needs to be re-performed on the plurality of battery packs 161 according to the above-mentioned method.

In the discharge process of the power supply device 16, if the temperature of the battery pack 161 is greater than or equal to the preset temperature threshold, the power supply management module 163 adds the battery pack 161 to the discharge queue after waiting for the temperature of the battery pack 161 changing to be less than the preset temperature threshold and controls the battery pack 161 to discharge.

Figure 6:
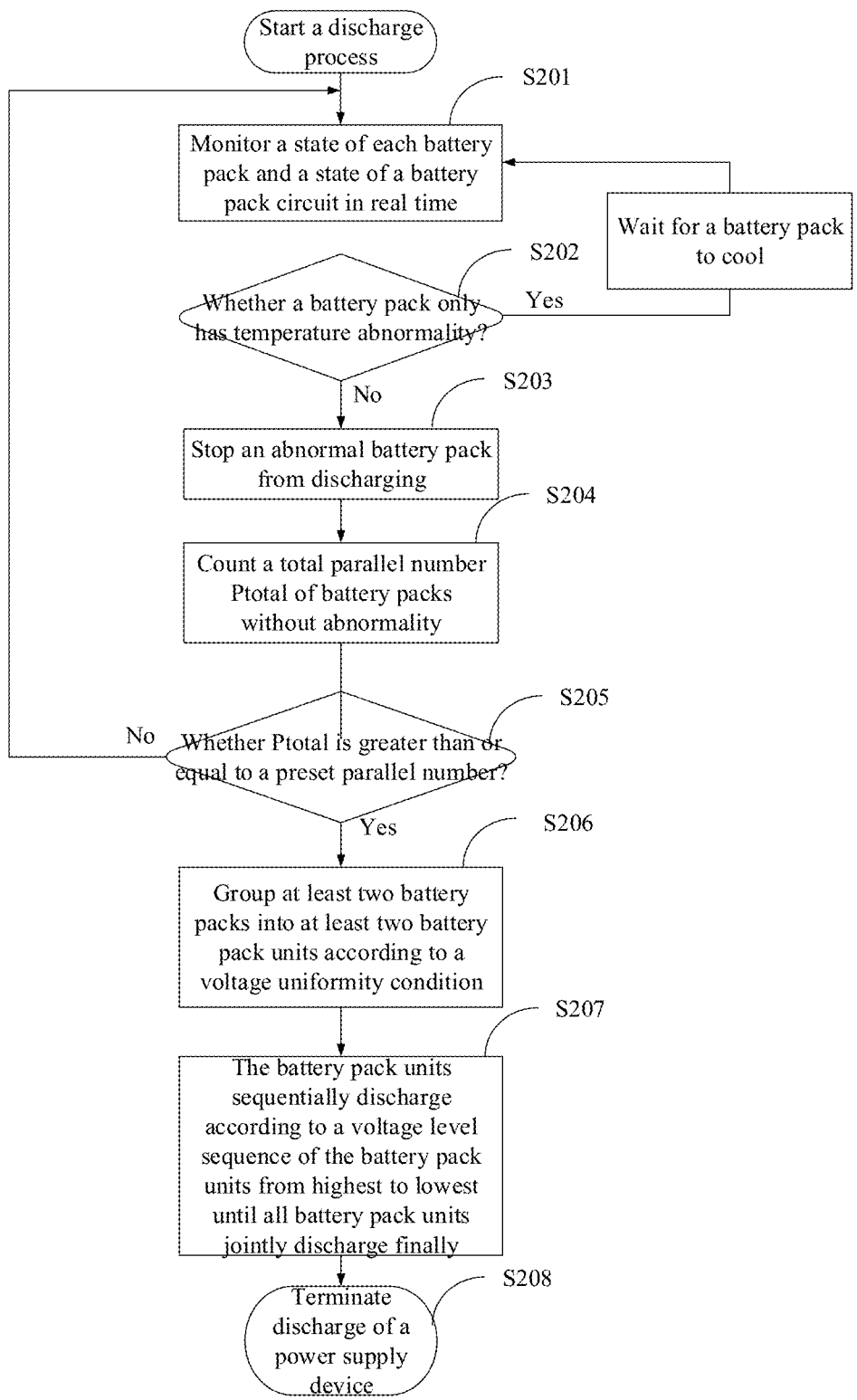
FIG. 6 is a flowchart of a discharge method of a power supply device of a riding-type mower according to one example of the present application.

Referring to FIG. 6, FIG. 6 illustrates another discharge method of the power supply device of the riding-type mower 100, and the discharge method includes steps described below.

In step S201, a state of each battery pack and a state of a battery pack circuit in each battery compartment 162 are monitored in real time.

For example, whether a voltage of the battery pack 161, a temperature of the battery pack 161, a discharge current of a single battery pack circuit and a temperature of a MOS tube of the battery pack circuit appear abnormalities is monitored, if the battery pack 161 inserted into the battery compartment 162 is overheated or unbalanced, a discharge current of a single-path battery pack is greater than an over current protection threshold (such as 50 A) or a duration of the discharge current of the single-path battery pack being greater than the over current protection threshold (such as 50 A) is greater than a preset duration (such as 30 s), or the MOS of the battery pack circuit is overheated, it is determined that the battery pack 161 is in an abnormal state or an inoperative state.

In step S202, whether a battery pack only has temperature abnormality is determined.

If a battery pack only has the temperature abnormality, the battery pack joins the battery pack discharge queue after the temperature of the battery pack is restored to a normal temperature, and the power management module 163 can control the battery pack to discharge. If the battery pack has more than temperature abnormality, step S203 is turned to.

In one example, the temperature monitoring circuit detects the temperature of each battery pack 161 in real time, and the power management module 163 determines whether the temperature of each battery pack 161 satisfies a temperature condition for charging and discharging. For example, when whether the temperature of the battery pack 161 is greater than or equal to the preset temperature threshold is determined, if the battery pack 161 satisfies the charging and discharging condition and has no other abnormal conditions, the battery pack 161 is determined to be free of abnormalities; and if the battery pack has only the temperature abnormality, after waiting for cooling of the battery pack 161 and monitoring the temperature of the battery pack until the temperature of the battery pack returns a normal state, the battery pack 161 joins the discharge queue, and the battery pack 161 is controlled to discharge.

In step S203, an abnormal battery pack is stopped from discharging.

When a battery pack 161 in the abnormal state is monitored, the power management module 163 stops the battery pack 161 in the abnormal state from discharging. In other examples, in the discharge process, if an abnormality occurs in the battery pack 161, the power management module 163 controls all the battery packs 161 to stop discharging, removes the abnormal battery pack 161 from the discharge queue, and re-performs discharge control on other battery packs 161 satisfying the discharge condition according to the above-mentioned method.

In step S204, a total parallel number $P_{total}$ of battery packs without abnormality is counted.

The above-mentioned step S103 is referred to.

In step S205, whether $P_{total}$ is greater than or equal to the preset parallel number is determined.

In this example, if the total parallel number of battery packs 161 is less than the preset parallel number, it may be considered that in step S202, a battery pack 161 previously having an abnormal temperature has restored to the normal temperature during waiting, so step S201 can be returned to until the total parallel number $P_{total}$ of battery packs without abnormality is greater than or equal to the preset parallel number. In one example, timekeeping may be performed after step S701 is returned to, and the discharge process is exited after a preset period of time (such as 5 min) is exceeded, so as to avoid energy waste caused by long-time waiting or program cycling.

In step S206, at least two battery packs are grouped into at least two battery pack units according to the voltage uniformity condition.

The above-mentioned step S105 is referred to.

In step S207, battery pack units sequentially discharge according to the voltage level sequence of the battery pack units from highest to lowest until all battery pack units jointly discharge finally.

The above-mentioned step S106 is referred to.

In this example, when the plurality of battery packs 161 are grouped into one battery pack unit according to the voltage uniformity condition, the plurality of battery packs 161 discharge at the same time.

In step S208, the discharge of the power supply device 16 is terminated.

In the discharge process, when a battery pack 161 is inserted or pulled out, the discharge control needs to be re-performed on the plurality of battery packs 161 according to the above-mentioned method.

As shown in FIG. 7, the riding-type mower 100 or the power supply device 16 includes at least a first battery pack circuit and a second battery pack circuit which are connected in parallel, where the first battery pack circuit includes a first battery pack 161a and a first electronic switch which are connected in series with each other, and the second battery pack circuit includes a second battery pack 161b and a second electronic switch which are connected in series with each other. The power management module 163 controls the first electronic switch on the first battery pack circuit and the second electronic switch on the second battery pack circuit, such that output current of the at least two battery packs 161 connected in parallel are between a first rated current and a second rated current. The first rated current is a working current at which the riding-type mower 100 can at least perform mowing, and the second rated current is a working current at which the riding-type mower 100 can at least perform walking. The first electronic switch and the second electronic switch may include a plurality of electronic switches, and the plurality of electronic switches are configured to be turned on when different charging and discharging conditions are satisfied, separately, so as to improve the safety and reliability of the charging and discharging process.

Referring to FIG. 7, in one example, the power supply device 16 includes the first battery pack circuit and the second battery pack circuit which are connected in parallel, the first battery pack circuit includes the first battery pack 161a, and the second battery pack circuit includes the second battery pack 161b connected in series.

The method of the power management module 163 controlling the two battery packs 161 to jointly discharge includes steps described below.

A voltage of the first battery pack 161a and a voltage of the second battery pack 161b are acquired.

Whether the voltage of the first battery pack 161a and the voltage of the second battery pack 161b are equal or substantially equal is determined. When the voltage of the first battery pack 161a and the voltage of the second battery pack 161b are equal or substantially equal, that is, a voltage difference between the first battery pack 161a and the second battery pack 161b is within a preset range, the first battery pack 161a and the second battery pack 161b are controlled to jointly discharge. When the difference between the voltage of the first battery pack 161a and the voltage of the second battery pack 161b is relatively large, that is, the voltage difference exceeds the preset range, a battery pack with a higher voltage between the first battery pack 161a and the second battery pack 161b is controlled to discharge first until the voltage of the first battery pack 161a and the voltage of the second battery pack 161b are equal or substantially equal, that is, the voltage difference is within the preset range, and then the first battery pack 161a and the second battery pack 161b are controlled to jointly discharge.

The power supply device 16 includes the first battery pack circuit and the second battery pack circuit which are connected in parallel with each other. The first battery pack circuit includes a discharge MOS tube Q11 and a charging MOS tube Q12 which are connected in series with the first battery pack 161a, the discharge MOS tube Q11 and the charging MOS tube Q12 are connected in subtractive series, and both the discharge MOS tube Q11 and the charging MOS tube Q12 include a parasitic diode.

The second battery pack circuit includes a discharge MOS tube Q21 and a charging MOS tube Q22 which are connected in series with the second battery pack 161b, the discharge MOS tube Q21 and the charging MOS tube Q22 are connected in subtractive series, and both the discharge MOS tube Q21 and the charging MOS tube Q22 include a parasitic diode.

In one example, the first battery pack 161a further includes a microcontroller, the second battery pack 161b further includes a microcontroller, and the microcontroller is configured to communicate with the controller 1633 of the power management module 163 of the power supply device 16 so as to ensure a normal charging and discharging process.

The method of the power management module 163 controlling the two battery packs 161 to jointly discharge includes steps described below. The charging MOS tube in the first battery pack circuit and the charging MOS tube in the second battery pack circuit are controlled to be turned on. A discharge MOS tube in a battery pack circuit where a battery pack with a higher voltage between the first battery pack 161a and the second battery pack 161b is located is controlled to be turned on. When a current of a battery pack circuit where a battery pack with a lower voltage between the first battery pack 161a and the second battery pack 161b is located is greater than a first preset current threshold, the discharge MOS tube in this battery pack circuit is controlled to be turned on so as to enable the first battery pack 161a and the second battery pack 161b to jointly discharge.

In one example, a value of the first preset current threshold ranges from 0 A to 3 A.

Figure 8:
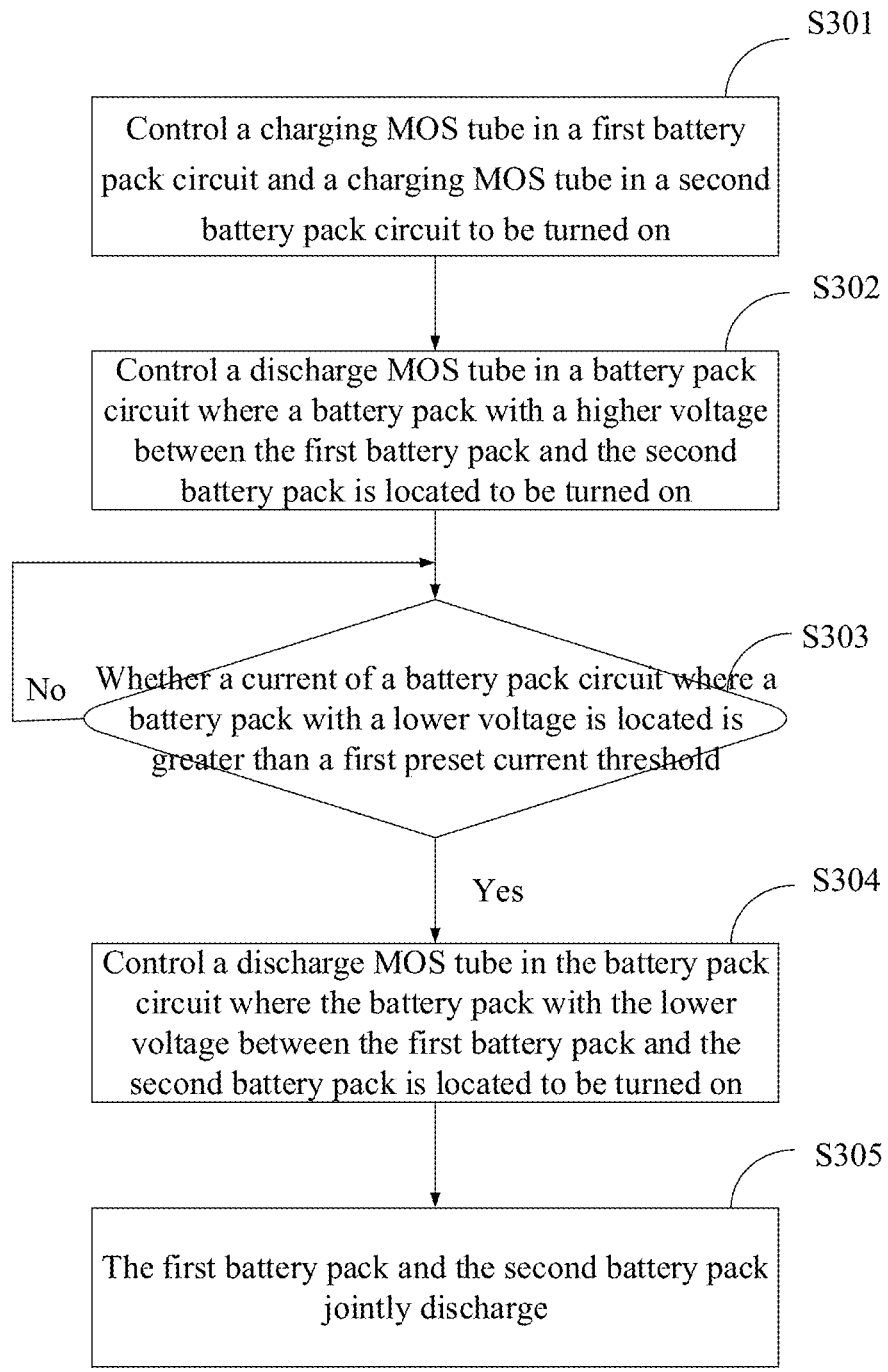
FIG. 8 is a flowchart of a discharge method of the power supply device of the riding-type mower shown in FIG. 7 according to one example of the present application.

Referring to FIG. 8, the method of the power management module 163 controlling the two battery packs 161 to jointly discharge includes steps described below.

In step S301, a charging MOS tube in the first battery pack circuit and a charging MOS tube in the second battery pack circuit are controlled to be turned on.

In step S302, a discharge MOS tube in a battery pack circuit where a battery pack 161 with a higher voltage between the first battery pack 161a and the second battery pack 161b is located is controlled to be turned on.

In step S303, whether a current of a battery pack circuit where a battery pack with a lower voltage is located is greater than the first preset current threshold is determined. If the current of the battery pack circuit where the battery pack with the lower voltage is located is greater than the first preset current threshold, step S104 is turned to. If the current of the battery pack circuit where the battery pack with the lower voltage is located is less than the first preset current threshold, step S103 is turned to, and the discharge of the battery pack with the higher voltage between the first battery pack 161a and the second battery pack 161b is continued until the current of the battery pack circuit where the battery pack with the lower voltage is located being greater than the preset current threshold is detected. In one example, a value of the first preset current threshold ranges from 0 A to 3 A.

In step S304, a discharge MOS tube in the battery pack circuit where the battery pack with the lower voltage between the first battery pack and the second battery pack is located is controlled to be turned on.

In step S305, the first battery pack 161a and the second battery pack 161b jointly discharge.

Assuming that the voltage of the first battery pack 161a is greater than the voltage of the second battery pack 161b, for example, the voltage of the first battery pack 161a is 58V and the voltage of the second battery pack 161b is 50V, then a process of the controller 1633 of the power management module 163 controlling the two battery packs 161 to discharge includes steps described below. The controller 1633 transmits a control signal to a first branch discharge MOS tube Q11 of the first battery pack circuit and a second branch discharge MOS tube Q21 of the second battery pack circuit so as to enable the first branch discharge MOS tube Q11 of the first battery pack circuit and the second branch discharge MOS tube Q21 of the second battery pack circuit to be turned on.

The controller 1633 compares the voltages of the respective battery packs 161 and controls the battery pack 161 with a high voltage to discharge first. In one example, the controller 1633 compares and determines, according to the voltages of the battery packs 161 detected by a voltage monitoring module 165 disposed in the power supply device 16, the battery pack 161 with the higher voltage and transmits a control signal to the battery pack 161 with the higher voltage to discharge first. In this example, the voltage of the first battery pack 161a is 58V, and the voltage of the second battery pack 161b is 50V. Therefore, the controller 1633 transmits the control signal to a first branch charging MOS tube Q12 connected in series on the first battery pack circuit to turn on the first branch charging MOS tube Q12, such that both the first branch discharge MOS tube Q11 and the first branch charging MOS tube Q12 of the first battery pack circuit are turned on, and the first battery pack 161a discharges first.

After the voltage of the first battery pack 161a reduces to be equal or substantially equal to the voltage of the second battery pack 161b, the controller 1633 controls the first battery pack 161a and the second battery pack 161b to jointly discharge.

As shown in FIG. 7, the first battery pack circuit further includes a current detection circuit 166a, and the current detection circuit 166a is configured to detect a current of the first battery pack circuit. The second battery pack circuit further includes a current detection circuit 166b, and the current detection circuit 166b is configured to detect a current of the second battery pack circuit. During the discharge of the first battery pack 161a, both the discharge MOS tube Q11 and the charging MOS tube Q12 on the first battery pack circuit are turned on, the first battery pack discharges through the discharge MOS tube Q11 and the charging MOS tube Q12, and the first battery pack circuit has a current flow. At this time, only the charging MOS tube Q22 in the second battery pack circuit is turned on, but since the discharge MOS tube Q21 has the parasitic diode, even if the discharge MOS tube Q21 in the second battery pack circuit is not turned on, if a positive voltage difference exists between two ends of the discharge MOS tube Q21, a low current still will flow through the parasitic diode.

In this example, since the voltage of the first battery pack 161a is greater than the voltage of the second battery pack 161b, a voltage difference between the two ends of the parasitic diode of the discharge MOS tube Q21 on the second battery pack circuit is negative, the parasitic diode of the discharge MOS tube Q21 on the second battery pack circuit cannot be turned on, and a current value detected by the current detection circuit 166b of the second battery pack circuit is zero. As time goes on, the first battery pack 161a discharges and a voltage value of the first battery pack 161a continuously decreases; when the voltage of the first battery pack 161a reduces to be equal or substantially equal to the voltage of the second battery pack 161b, that is, the voltage difference is within the preset range, such that the parasitic diode of the second branch discharge MOS tube Q21 can be turned on, a low current flows through the parasitic diode of the discharge MOS tube Q21 on the second battery pack circuit, and the current detected by the current detection circuit 166b of the second battery pack circuit is greater than the preset threshold. The controller 1633 determines, based on the current detected by the current detection circuit 166b, that the voltage of the first battery pack 161a is equal or substantially equal to the second battery pack 161b, that is, the voltage difference is within the preset range, and then the controller 1633 outputs the control signal to control the discharge MOS tube Q21 of the second battery pack circuit to be turned on, such that the first battery pack 161a and the second battery pack 161b jointly discharge. In one example, a value of the preset current threshold ranges from 0 to 3 A.

In the above-mentioned examples, the power supply device 16 includes two battery packs 161. In other examples, when the power supply device 16 includes a plurality of dischargeable battery packs 161, the power management module 163 controls the plurality of battery packs 161 to discharge according to the above-mentioned similar method.

Referring to FIG. 9, the power supply device 16 includes a plurality of battery pack circuits connected in parallel, each battery pack circuit includes a battery pack 161 (BAT1, BAT2, BAT3, BAT4, BAT5, and BAT6), a discharge MOS tube (Q11, Q21, Q31, Q41, Q51, and Q61) and a charging MOS tube (Q12, Q22, Q32, Q42, Q52, and Q62), and the battery pack 161, the discharge MOS tube and the charging MOS tub are connected in series. The discharge MOS tube is configured to control the battery pack 161 to discharge, and the charging MOS tube is configured to control the battery pack 161 to charge. The discharge MOS tube and the charging MOS tube are connected in series, and the discharge MOS tube and the charging MOS tube include a parasitic diode connected to the discharge MOS tube in parallel and a parasitic diode connected to the charging MOS tube in parallel, respectively. In one example, a control end of each electronic switch of each battery pack 161 is electrically connected to a processor or a controller of a corresponding battery pack 161 through an isolated drive circuit so as to improve the effectiveness of the processor or the controller in controlling the electronic switch.

The power management module 163 is configured to enable each charging MOS tube in the plurality of battery pack circuits to be turned on and enable a discharge MOS tube in a battery pack circuit where a battery pack 161 with a highest voltage is located to be turned on. When a current of any one of the plurality of battery pack circuits is greater than the first preset current threshold, the power management module 163 is configured to control the discharge MOS tube in the one battery pack circuit to be turned on, so as to enable the battery pack 161 with the highest voltage and the battery pack 161 of the battery pack circuit where a current of the battery pack circuit is greater than the first preset current threshold to jointly discharge.

FIG. 9 illustrates a power supply device 16 according to one example, the power supply device 16 includes six battery packs 161 and battery pack circuits composed of the six battery packs 161, and six battery pack circuits 161 are connected in parallel.

Figure 10:
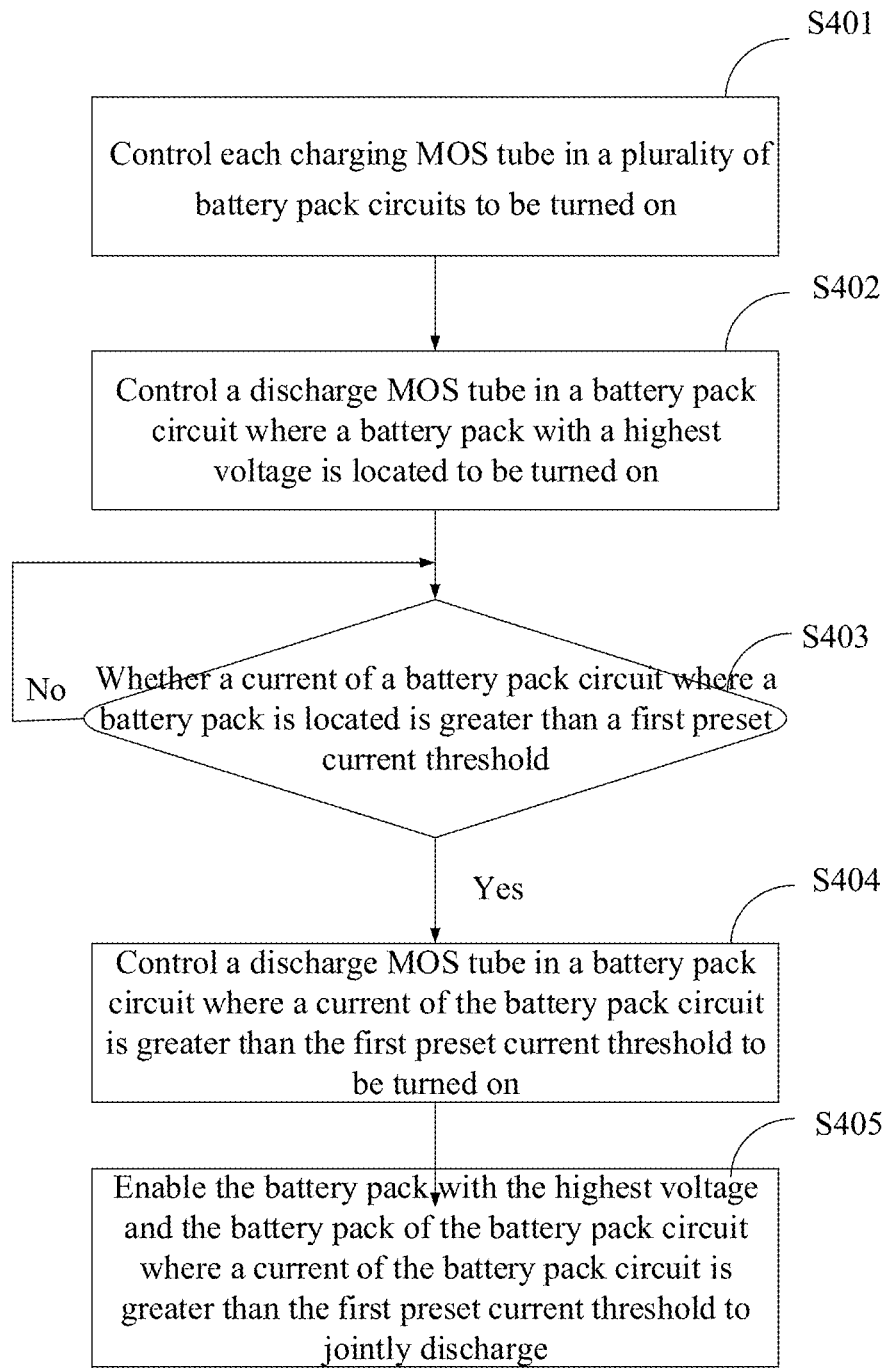
FIG. 10 is a flowchart of a discharge method of the power supply device of the riding-type mower shown in FIG. 9 according to one example of the present application.

Referring to FIG. 10, FIG. 10 illustrates a discharge method of the power supply device 16 of the riding-type mower 100 according to one example, and the discharge method includes steps described below.

In step S401, each charging MOS tube in the plurality of battery pack circuits is turned on.

In this example, the power management module 163 controls each charging MOS tube (Q12, Q22, Q32, Q42, Q52, and Q62) in each battery pack circuit to be turned on.

In step S402, a discharge MOS tube in a battery pack circuit where a battery pack 161 with a highest voltage is located is turned on.

Assuming that the voltage of the battery pack BAT6 is the highest, the discharge MOS tube Q61 of the battery pack circuit where the battery pack BAT6 is located is controlled to be turned on.

In step S403, whether a current of a battery pack circuit is greater than the first preset current threshold is determined.

The current monitoring circuit 166 of each battery pack circuit monitors a current of a battery pack circuit where the current monitoring circuit 166 is located and outputs the current to the controller 1633 of the power management module 163. The controller 1633 of the power management module 163 determines, according to a current value detected by the current monitoring circuit 166 of each battery pack circuit, whether the current of each battery pack circuit is greater than the first preset current threshold.

In step S405, the battery pack 161 with the highest voltage and the battery pack 161 of the battery pack circuit where a current of the battery pack circuit is greater than the first preset current threshold jointly discharge.

When a current of any one of the plurality of battery pack circuits is greater than the first preset current threshold, the power management module 163 controls the discharge MOS tube in the one battery pack circuit to be turned on, so as to enable the battery pack 161 with the highest voltage and the battery pack 161 of the battery pack circuit where a current of the battery pack circuit is greater than the first preset current threshold to jointly discharge.

According to the above-mentioned mode, assuming that voltages of the above-mentioned battery packs BAT1, BAT2, BAT3, BAT4, BAT5, and BAT6 are sequentially increased, the power management module 163 first controls the charging MOS tube of the battery pack circuit where a respective battery pack 161 is located to be turned on and controls the discharge MOS tube Q61 of the battery pack circuit where the battery pack BAT6 is located to be turned on so as to enable the battery pack BAT6 to discharge first. When it is detected that the current of the battery pack circuit where the battery pack BAT5 is located is greater than the first preset current threshold, the power management module 163 controls the discharge MOS tube of the battery pack circuit where the battery pack BAT5 is located to be turned on so as to enable the battery pack BAT5 and the battery pack BAT6 discharge simultaneously. When it is detected that the current of the battery pack circuit where the battery pack BAT4 is located is greater than the first preset current threshold, the power management module 163 controls the discharge MOS tube of the battery pack circuit where the battery pack BAT4 is located to be turned on so as to enable the battery pack BAT4, the battery pack BAT5 and the battery pack BAT6 to discharge simultaneously; and so on. The power management module 163 controls the plurality of battery packs 161 to discharge according to the above-mentioned method. Enabling the battery packs 161 to jointly discharge according to the voltage level sequence from highest to lowest has an advantage that the battery pack 161 with a higher voltage charging the battery pack 161 with a lower voltage can be avoided, thus facilitating the operation of the riding-type mower 100.

In an operational process of the riding-type mower 100, a condition that a direction of a rotation speed of the second motor 143 is opposite to a torque direction may appear (for example, in a process of braking or downhill), the second motor 143 is in a power generation state, a current output from the power supply device 16 to the second motor 143 is reduced, and the battery pack 161 may not be required for power supply at this time. In this example, when a current of any one of the plurality of battery pack circuits except the battery pack circuit where the battery pack with the highest voltage is located is less than a second preset current threshold, a discharge MOS tube in the one battery pack circuit is controlled to be turned off. In one example, a value the second preset current threshold ranges from 0 A to 3 A. Due to the power generation of the second motor 143, excess energy will be generated, while holding a current path of the battery pack 161 with the highest voltage not off can determine whether energy recovery is required (see the details below), such that the excess energy is fed back to the battery pack 161, and the excess energy can also be prevented from damaging electronic components in the circuit, such as MOS tubes.

As shown in FIG. 9, the riding-type mower 100 further includes a total current detection circuit 168. The total current detection circuit 168 is configured to detect a current in a total current loop output by the power supply device 16. The power management module 163 is configured to: in a discharge process of the power supply device 16, after a total current being less than a third preset current threshold is detected, enable a charging MOS tube and a discharge MOS tube in a battery pack circuit where a battery pack 161 with a lowest voltage is located to be turned on, and charging MOS tubes and discharge MOS tubes in battery pack circuits where the rest battery packs except the battery pack with the lowest voltage are located to be turned off. That is to say, when it is detected that the total current is negative, it can be determined that the second motor 143 is in the power generation state, and an energy recovery mode is entered at this time. In the energy recovery mode, a current loop of the battery pack 161 with the lowest voltage is kept open, such that excess energy generated by the power generation of the second motor 143 can be fed back into the battery pack 161 with the lowest voltage. On one hand, energy recovery and utilization can be achieved, and on the other hand, the excess energy can be prevented from damaging electronic components in the circuit, such as charging MOS tubes and discharging MOS tubes.

In one example, a value of the third preset current threshold ranges from −3 A to 0 A. In this way, when the total current being negative is detected, it can be determined that the second motor 143 is in the power generation state. In one example, the value of the third preset current threshold ranges from −1 A to 3 A. In this way, a possible condition that the power supply device repeatedly enters and exits the energy recovery mode due to current fluctuation can be avoided, and the energy recovery mode can be accurately entered, thus timely preventing excessive energy from damaging electronic components in the circuit.

The electric energy output by the power supply device 16 of the riding-type mower 100 can be used by a plurality of loads, and the loads include the walking unit 14, the mowing unit 13, and other auxiliary function modules. The walking unit 14 and the mowing unit 13 are two main function modules of the riding-type mower 100 and can achieve the walking function and the mowing function of the riding-type mower 100, respectively. In this example, as shown in FIG. 4, the mowing unit 13 includes three first motors 131, and the walking unit 14 includes two second motors 143. Under normal circumstances, the current output by the battery pack 161 can satisfy the usage requirement, but when the load suddenly increases (for example, during uphill or the grass is dense), the output current will also suddenly increase, and at this time, the total current of the discharge loop may exceed the safe current range, that is, overcurrent phenomenon will occur, which will affect the service life of the battery pack 161 and even bring safety problems.

In this example, when the overcurrent phenomenon occurs, current-limiting protection treatment is performed on each load such that the total output current of the power supply device 16 is reduced below the safe current. In this example, when the overcurrent phenomenon occurs in the discharge process of the power supply device 16, the riding-type mower 100 reasonably limits the current of each load according to a preset rule, that is, the current output by the power supply device 16 is reasonably distributed, so as to not only enable the total output current to be less than or equal to the over current protection (OCP) threshold and but also ensure that the riding-type mower 100 can satisfy the actual working condition requirements. A current-limiting protection method of the riding-type mower 100 for a plurality of loads includes steps described below. An over current protection (OCP) threshold is preset. The total output current of the power supply device 16 is monitored in real time. Whether the total output current exceeds the OCP threshold is determined. When the total output current exceeds the OCP threshold, current-limiting protection information is generated according to a preset rule such that the total output current of the power supply device 16 reduces to be equal to or less than the OCP threshold. The current-limiting protection information includes a current distribution rule for the plurality of loads, and each load limits its own current according to received current-limiting protection information, thus achieving current-limiting protection.

The riding-type mower 100 includes a current-limiting protection unit 1634, the current-limiting protection unit 1634 may be disposed in the power management module 163 (as shown in FIG. 4), and the current-limiting protection unit 1634 is configured to coordinate and distribute the current flowing to each load such that the total output current of the power supply device 16 reduces to be equal to or less than the OCP threshold. The current-limiting protection unit 1634 generates current-limiting protection information and transmits the current-limiting protection information to each load, and the current-limiting protection information includes a current distribution rule for a plurality of loads. The current-limiting protection unit 1634 may relate to software, hardware, or both the software and the hardware. In other examples, the current-limiting protection unit 1634 may also be disposed in the load, and the current-limiting protection unit 1634 is configured to coordinate and distribute the current flowing to each load such that the total output current of the power supply device 16 reduces to be equal to or less than the OCP threshold.

Figure 11:
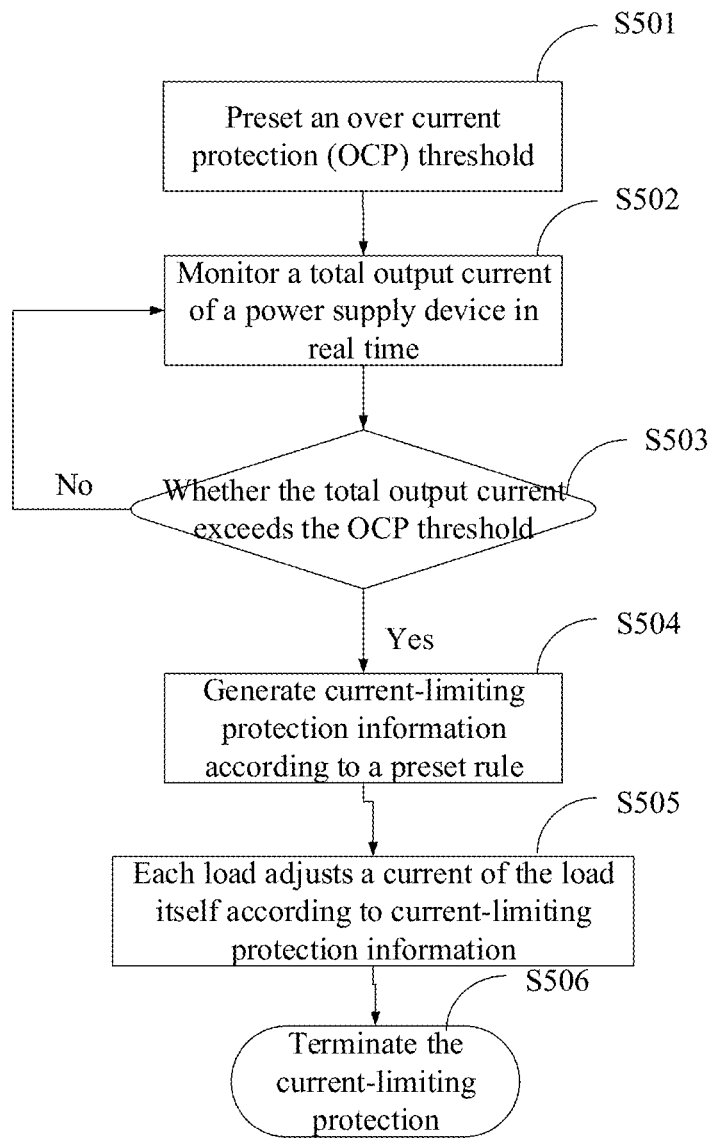
FIG. 11 is a flowchart of a current-limiting protection method of a riding-type mower according to one example of the present application.

Referring to FIG. 11, the power output by the power supply device 16 of the riding-type mower 100 being only supplied to the walking unit 14 and the mowing unit 13 for use is described as an example to illustrate a multi-load current-limiting protection method of the riding-type mower 100. The plurality of loads of the riding-type mower 100 include not only the walking unit 14 and the mowing unit 13, but may also include other auxiliary function modules, such as a function of lighting or cell phone charging. The multi-load current-limiting protection method of the riding-type mower 100 shown in FIG. 11 includes steps described below.

In S501, an over current protection (OCP) threshold is preset.

The OCP threshold is set by a user according to the characteristics of the battery pack 161 used by the riding-type mower 100 or the characteristics of the riding-type mower 100, or according to both the characteristics of the battery pack 161 and the characteristics of the riding-type mower 100.

In one example, a maximum safety current that can be output by the plurality of battery packs 161 currently used by the riding-type mower 100 is set to the OCP threshold, and when the actual current of the power supply device 16 exceeds the maximum safety current, the service life of the battery packs 161 will be affected and even safety problems will be caused. In one example, the OCP threshold ranges from 80 A to 200 A.

In S502, a total output current of the power supply device 16 is monitored in real time.

In one example, the total current detection circuit 168 monitors the magnitude of the total current on the discharge loop in real time. In other examples, the current detection circuit 166 on a loop of each battery pack 161 monitors the current output by each battery pack 161 in real time, and the magnitude of the total output current of the power supply device 16 is obtained by summing the output current of each battery pack 161.

In S503, whether the total output current of the power supply device 16 exceeds the OCP threshold is determined; if yes, step S504 is turned to; and if no, step S502 is turned to.

In one example, the controller 1633 of the power management module 163 determines whether the total output current of the power supply device 16 exceeds the OCP threshold, and if yes, step S504 is turned to.

In S504, current-limiting protection information is generated according to a preset current distribution rule, and the current-limiting protection information includes a current distribution rule for each load.

When the total output current of the power supply device 16 exceeding the OCP threshold is detected, the current-limiting protection unit 1634 generates the current-limiting protection information according to the preset current distribution rule so as to enable the total output current of the power supply device 16 reduce to be equal to or less than the OCP threshold. The current-limiting protection information includes the current distribution rule for each load and the specific current distribution rule is described below in detail.

In one example, when the power management module 163 determines that the total output current of the power supply device 16 exceeds the OCP threshold, the power management module 163 transmits an overcurrent signal to the current-limiting protection unit 1634, and the current-limiting protection unit 1634 generates the current-limiting protection information according to the preset rule and transmits the current-limiting protection information to each load. The current-limiting protection information includes the current distribution rule for each load. In this example, the current-limiting protection unit 1634 is disposed in the power management module 163, and the power management module 163 can transmit the current-limiting protection information to a control unit of each load through a bus.

In S505, each load adjusts a current of the load itself according to the current-limiting protection information.

After a controller of each load receives the current-limiting protection information, each load adjusts the current of the load itself according to the current distribution rule in the current-limiting protection information so as to enable the total output current of the power supply device 16 reduce to be equal to or less than the OCP threshold.

For example, the first controller 144 of the mowing unit 13 controls the first motor 131, and the first motor 131 limits its own current in a deceleration mode. The second controller 144 of the walking unit 14 controls the second motor 143, and the second motor 143 limits its own current in the deceleration mode.

In S506, current-limiting protection is terminated.

The current-limiting protection is terminated when the total output current of the power supply device 16 reduces to be equal to or less than the OCP threshold.

The riding-type mower 100 has a complex operating condition. For example, in a mowing process of the riding-type mower 100, if the riding-type mower 100 encounters an uphill slope, the current required by the walking unit 14 is greater than the current required by the mowing unit 13, otherwise it is not conducive for the riding-type mower 100 to climb the hill. While if the riding-type mower 100 encounters a downhill slope, the current supplied to the walking unit 14 may be less than the current supplied to the mowing unit 13. In addition, it is also necessary to ensure that the walking unit 14 obtains sufficient electric energy to successfully return to the base after the mowing operation is completed. Therefore, in the face of the complex operating condition of the riding-type mower 100, when the riding-type mower 100 has the overcurrent phenomenon, how to distribute the current flowing to each load such that the total current output by the power supply device 16 is less than or equal to the OCP threshold and the riding-type mower 100 satisfies the actual operating condition requirements is a challenging task.

For this purpose, in several examples of the current distribution rule for each load in the current-limiting protection information provided by the present application, the total current output by the power supply device 16 can be below the safe current and the riding-type mower 100 can satisfy the actual operating condition requirements.

EXAMPLE ONE

A current distribution ratio of each load during current-limiting protection is set, that is, a current upper limit (that is, a current-limiting protection current) of each load during current-limiting protection is set in advance, and a proportion of each current-limiting protection current in the OCP threshold is a fixed value, that is, a fixed current distribution ratio (hereinafter referred to as a current-limiting protection current distribution ratio). Each load corresponds to a same or different current-limiting protection currents or current-limiting protection current distribution ratios. For example, the first motor 131 corresponds to a first current-limiting protection current distribution ratio or a first current-limiting protection current, and the second motor 143 corresponds to a second current-limiting protection current distribution ratio or a second current-limiting protection current.

In one example, for the riding-type mower 100, the first thing that needs to be ensured is the walking function of the walking unit 14 such that the riding-type mower 100 can return to the base after the mowing operation is completed. Therefore, the first current-limiting protection current or the first current-limiting protection current distribution ratio of the first motor 131 of the mowing unit 13 may be set to be less than the second current-limiting protection current or the second current-limiting protection current distribution ratio of the second motor 143 of the walking unit 14. For example, the first current-limiting protection current is set to 25% of the OCP threshold or the first current-limiting protection current distribution ratio is set to 25%, and the second current-limiting protection current is set to 75% of the OCP threshold or the second current-limiting protection current distribution ratio is set to 75%.

For example, the OCP threshold is set to 80 A. If the load suddenly increases (for example, a dense amount of grass is encountered), the total output current of the power supply device 16 rises to 90 A and exceeds the preset OCP threshold (that is, 80 A), at this time, the total current detection circuit 168 of the power supply device 16 detects that the total output current of the power supply device 16 exceeds the OCP threshold, the power management module 163 outputs the current-limiting protection signal to the current-limiting protection unit 1634, and the current-limiting protection unit 1634 generates the current-limiting protection information.

The plurality of loads limit the actual currents thereof within a range of the current-limiting protection current of the load itself according to the respective current limit protection currents or current limit protection current distribution ratios, such that the total output current of the power supply device 16 reduces to be less than or equal to the OCP threshold, thereby achieving overcurrent protection.

In one example, after the plurality of loads receive the current-limiting protection information including the current-limiting protection current distribution ratio or the current-limiting protection current of the load itself, whether the actual current of the load itself exceeds the current-limiting protection current of the load itself is determined. If the actual current of the load itself exceeds the current-limiting protection current of the load, the current of the load itself is limited within the current-limiting protection current of the load; and if the actual current of the load itself does not exceed the current-limiting protection current of the load, the load continues to operate at the present current.

To sum up, the current distribution rule in example one includes steps described below. The current-limiting protection current or the current-limiting protection current distribution ratio of each load is set. Whether a present working current of each load exceeds the current-limiting protection current or the current-limiting protection current distribution ratio of the load itself is determined. When it is determined that the present working current of the load exceeds the current-limiting protection current or the current-limiting protection current distribution ratio of the load itself, the present working current of the load is reduced until the current of the load is less than or equal to the current-limiting protection current of the load itself or a current corresponding to the current-limiting protection current distribution ratio of the load itself. When it is determined that the present working current of the load does not exceed the current-limiting protection current of the load itself, the load continues to operate at the present working current.

Figure 12:
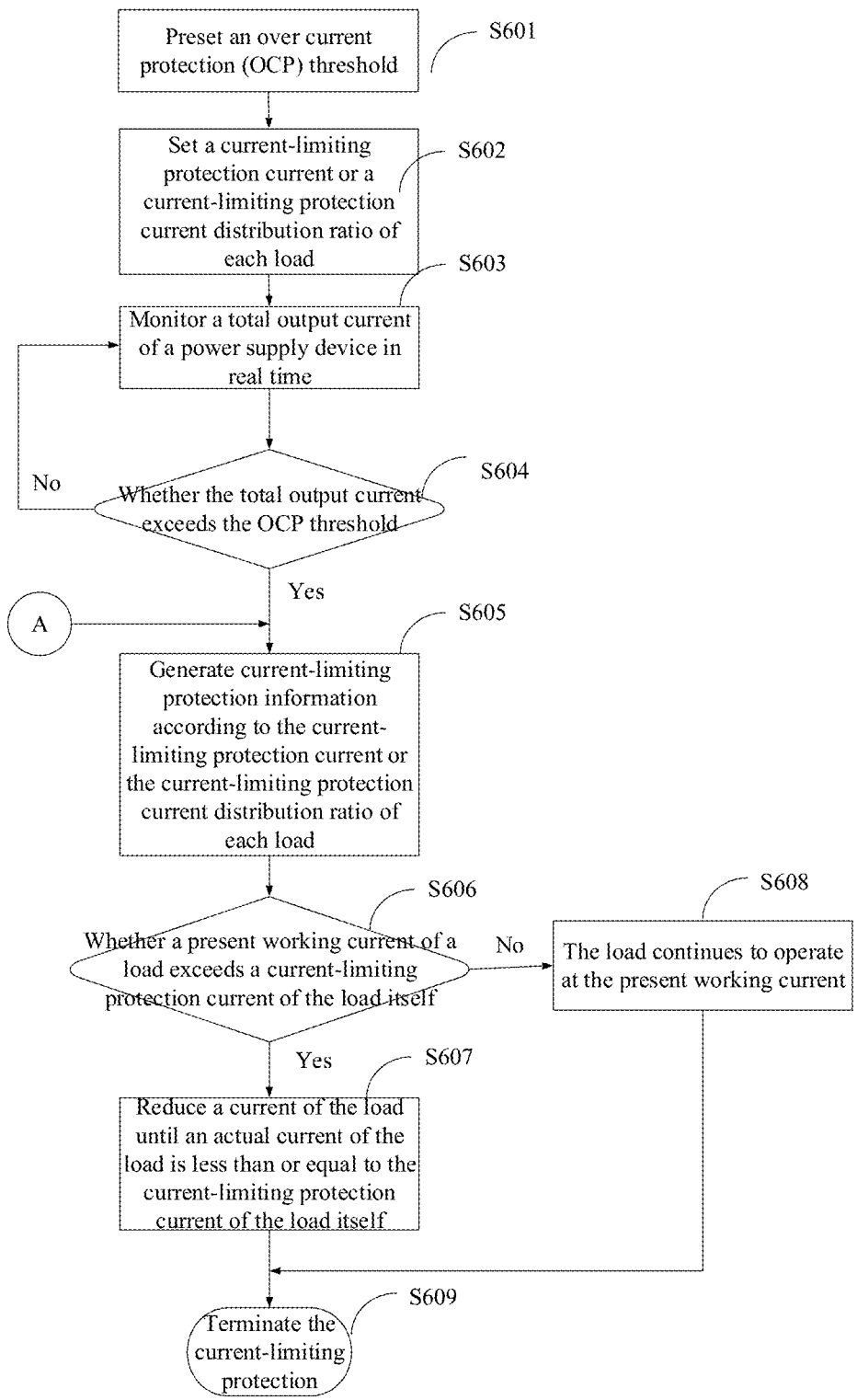
FIG. 12 is a flowchart of a current-limiting protection method of a riding-type mower according to one example of the present application.

In one example, referring to FIG. 12, the power output by the power supply device 16 being supplied only to the walking unit 14 and the mowing unit 13 is described as an example, and according to the current distribution rule of the example one, the multi-load current-limiting protection method of the riding-type mower 100 includes steps described below.

In step S601, an OCP threshold is preset.

In one example, the OCP threshold ranges from 80 A to 200 A.

In step S602, a current-limiting protection current or a current-limiting protection current distribution ratio of each load is set.

In one example, a first current-limiting protection current distributed by the current-limiting protection unit 1634 to the first motor 131 is 25% (that is, 20 A) of the OCP threshold, and a second current-limiting protection current distributed by the current-limiting protection unit 1634 to the second motor 143 is 75% (that is, 60 A) of the OCP threshold.

In one example, after the total output current of the power supply device 16 exceeds the OCP threshold, the current-limiting protection unit 1634 sets the current-limiting protection current or the current-limiting protection current distribution ratio of each load. In the present example, the current-limiting protection current or the current-limiting protection current distribution ratio of each load is preset before the overcurrent phenomenon occurs.

In step S603, a total current output by the power supply device 16 is monitored in real time.

In one example, the total current detection circuit 168 monitors the magnitude of the total current on the discharge loop in real time.

In step S604, whether the total output current of the power supply device 16 exceeds the OCP threshold is determined; if yes, step S605 is turned to; and if the total output current of the power supply device 16 does not exceed the OCP threshold, step S603 is turned to.

In one example, the controller 1633 of the power management module 163 determines whether the total output current of the power supply device 16 exceeds the OCP threshold; if yes, step S605 is turned to; and if the total output current of the power supply device 16 does not exceed the OCP threshold, step S603 is turned to.

In step S605, current-limiting protection information is generated according to the current-limiting protection current or the current-limiting protection current distribution ratio of each load.

When the total output current of the power supply device 16 exceeds the OCP threshold, the current-limiting protection unit 1634 generates the current-limiting protection information according to the set current-limiting protection current or the current-limiting protection current distribution ratio of each load. The current-limiting protection current or the current-limiting protection current distribution ratio is as described in step S602.

In step S606, whether a present working current of each load exceeds the current-limiting protection current of the load itself is determined; if yes, step S607 is turned to; and if the present working current of each load does not exceed the current-limiting protection current of the load itself, step S608 is turned to.

After receiving the current-limiting protection information, each load determines, according to the current-limiting protection current or the current-limiting protection current distribution ratio, whether the current of the load itself exceeds the current-limiting protection current of the load; if yes, step S607 is turned to; and if the current of the load itself does not exceed the current-limiting protection current of the load itself, step S508 is turned to.

In step S607, the current of the load itself is reduced until an actual current of the load is less than or equal to the current-limiting protection current of the load itself.

If the load determines that current of the load itself exceeds the current-limiting protection current of the load itself, the current of the load itself is reduced until the current of the load is less than or equal to the current-limiting protection current of the load.

In one example, when it is determined that the present working current of the mowing unit 13 or the walking assembly 14 exceeds the current-limiting protection current of the mowing unit 13 or the walking assembly 14, the current of the mowing unit 13 or the walking assembly 14 can be reduced by reducing a rotational speed of the first motor 131 or the second motor 143 until an actual working current of the mowing unit 13 or the walking assembly 14 is less than or equal to the current-limiting protection current of the mowing unit 13 or the walking assembly 14.

In step S608, the load continues to operate at the present working current. If the load determines that the current of the load itself does not exceed the current-limiting protection current of the load itself, the load continues to operate at the present working current.

In step S609, current-limiting protection is terminated. The current-limiting protection is terminated after the total output current of the power supply device 16 reduces to be equal to or less than the OCP threshold.

The current-limiting protection current or the current-limiting protection current distribution ratio of each load is set, and when the total output current of the power supply device 16 exceeds the OCP threshold, the current of each load is limited within the current-limiting protection current or the current-limiting protection current distribution ratio of the load itself, such that the output current of the power supply device 16 reduces to be equal to or less than the OCP threshold, thereby achieving the current-limiting protection.

EXAMPLE TWO

When the total output current of the power supply device 16 exceeds the OCP threshold, whether a present working current of a load exceeds the OCP threshold is determined first. If a present current working current of a load exceeds the OCP threshold, the current distribution rule is processed according to example one. If no present working current of a load exceeds the OCP threshold, according to a set sequence of priority levels of current-limiting protection for loads, current-limiting is selectively performed on one or more loads according to the sequence of the priority level from high to low. In this way, a fixed current distribution ratio can be avoided to be set, thus enabling the current to be effectively utilized. For example, the set OCP threshold is 80 A, the first current-limiting protection current is distributed to be 25% of the OCP threshold or the first current-limiting protection current distribution ratio is 25%; the second current-limiting protection current is distributed to be 75% of the OCP threshold or the second current-limiting protection current distribution ratio is distributed to be 75%; and at this time, the first current-limiting protection current is 20 A, and the second current-limiting protection current is 60 A. If it is detected that the total output current of the power supply 16 is 90 A, the total output current is greater than the set over current protection threshold 80 A. At this time, if the actual current of the first motor 131 is detected to be 60 A and the actual current of the second motor 143 is 20 A, according to the method of example one, the current of the first motor 131 needs to be limited from 60 A to the current-limiting protection current 20 A of the first motor 131, while the actual current 20 A of the second motor 143 does not exceed the current-limiting protection current 60 A of the second motor 143, so the second motor does not to be limited. In this way, the total current after current-limiting protection is 20 A+20 A=40 A, the total current is far less than the set over current protection threshold 80 A, the electric energy fails to be effectively utilized, thus affecting the service performance of the riding-type mower 100 and being unfavorable to the working effect of the riding-type mower 199.

A current distribution rule of example two includes steps described below. A priority level of current-limiting protection for each load is set. A present working current of each load is acquired. If the current working current of a load does not exceed the OCP threshold, a distribution current of a load requiring current-limiting is calculated according to a sequence of the priority levels of current-limiting protection for the loads. The current-limiting is selectively performed on one or more loads according to the calculated distribution current of the load on which current-limiting protection is preferentially performed until the total output current of the power supply device 16 is equal to or less than the OCP threshold.

The power output by the power supply device 16 being supplied only to the mowing unit 13 and the walking unit 14 is described as an example. Considering that the riding-type mower 100 requires sufficient electric energy to ensure a successful return to the base after the operation is completed, a priority level of current-limiting protection for the mowing unit 13 may be set higher than a priority level of current-limiting protection for the walking unit 14, that is, when the total output current of the power supply device 16 exceeds the OCP threshold, the current of the mowing unit 13 is preferentially limited.

Figure 13:
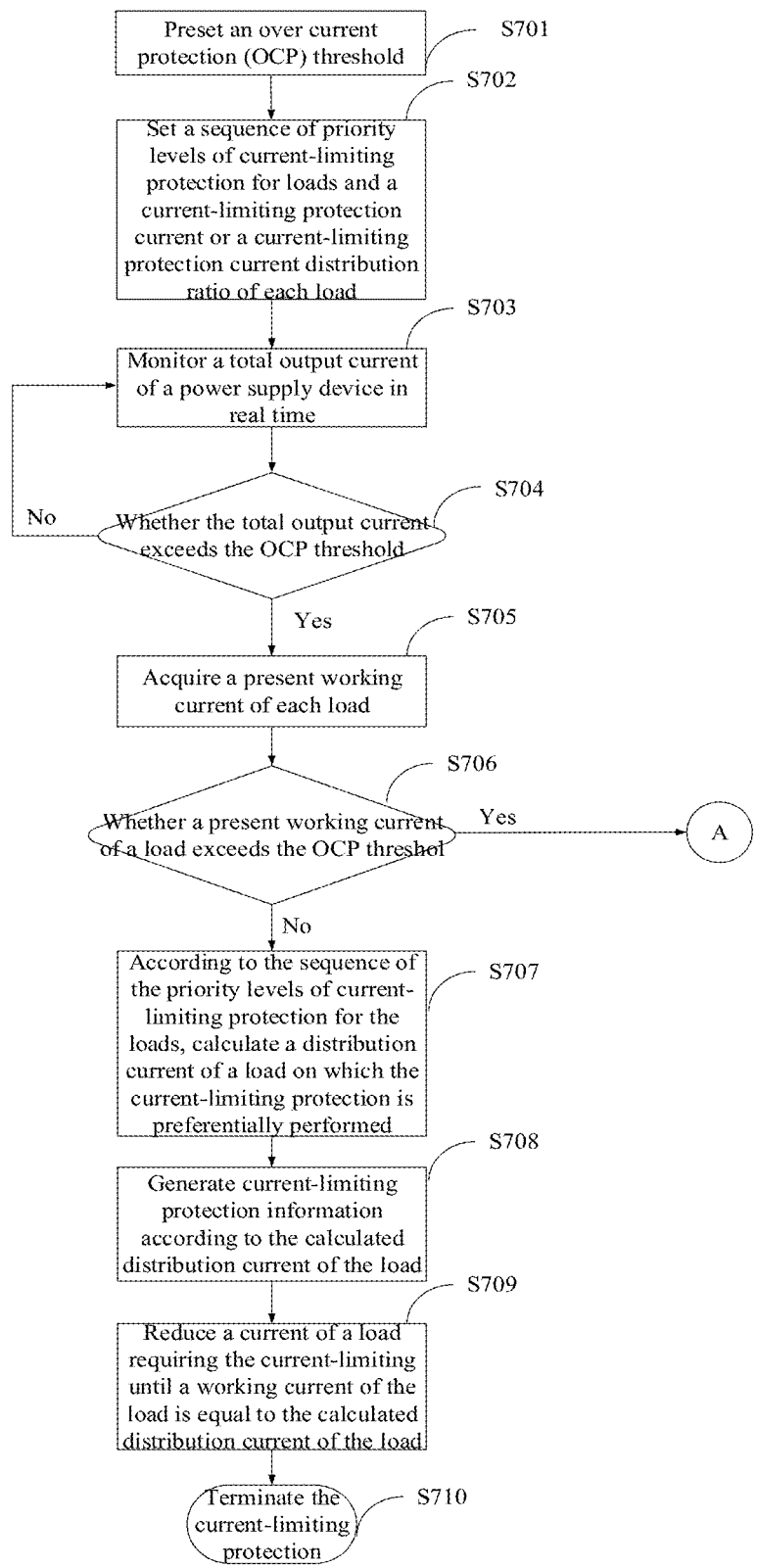
FIG. 13 is a flowchart of a current-limiting protection method of a riding-type mower according to one example of the present application.

Referring to FIG. 13, according to the current distribution rule of example two, the multi-load current-limiting protection method of the riding-type mower 100 includes steps described below.

In step S701, an OCP threshold is preset. In one example, the OCP threshold ranges from 80 A to 200 A.

In step S702, a sequence of priority levels of current-limiting protection for the loads and a current-limiting protection current or a current-limiting protection current distribution ratio of each load are set.

In one example, a priority level of current-limiting protection for the first motor 131 of the mowing unit 13 is set to I level, and a priority level of current-limiting protection for the second motor 143 of the walking unit 14 is set to be II level. That is to say, when the total output current of the power supply device 16 exceeds the OCP threshold, the current of the mowing unit 13 is preferentially limited.

In one example, a first current-limiting protection current distributed by the current-limiting protection unit 1634 to the first motor 131 is 25% of the OCP threshold (that is, 50 A), and a second current-limiting protection current distributed by the current-limiting protection unit 1634 to the second motor 143 is 75% of the OCP threshold (that is, 150 A). For example, when the OCP threshold is 200 A, the first current-limiting protection current distributed by the current-limiting protection unit 1634 to the first motor 131 is 50 A, and the second current-limiting protection current distributed by the current-limiting protection unit 1634 to the second motor 143 is 150 A.

In one example, after the total output current of the power supply device 16 exceeds the OCP threshold, the current-limiting protection unit 1634 sets the sequence of the priority levels of current-limiting protection for the loads and the current-limiting protection current or the current-limiting protection current distribution ratio of each load. In this example, the sequence of the priority levels of current-limiting protection for the loads and the current-limiting protection current or the current-limiting protection current distribution ratio of each load are preset before the overcurrent phenomenon occurs.

In step S703, a total output current of the power supply device 16 is monitored in real time. In one example, the total current detection circuit 168 monitors the magnitude of the total current on the discharge loop in real time.

In step S704, whether the total output current of the power supply device 16 exceeds the OCP threshold is determined; if the total output current of the power supply device 16 exceeds the OCP threshold, step S705 is turned to; and if the total output current of the power supply device 16 does not exceed the OCP threshold, step S703 is turned to.

In one example, the controller 1633 of the power management module 163 determines whether the total output current of the power supply device 16 exceeds the OCP threshold; if the total output current exceeds the OCP threshold, step S705 is turned to; and if the total output current of the power supply device 16 does not exceed the OCP threshold, step S703 is turned to.

In step S705, the present working current of each load is acquired. The current detection circuit 166 of each load detects the working current of each load. In one example, the current detection circuit 166 of each load transmits the detected working current of each load to the power management device 163. The current detection circuit 166 of each load transmits the detected working current of each load to the controller of each load, and the controller of each load transmits the present working current information to the power management device 163 in a bus mode.

In step S706, whether a present working current of a load exceeds the OCP threshold is determined; if a present working current of a load exceeds the OCP threshold, step A in FIG. 13 is turned to, and step A is executed according to partial content (FIG. 12) in example one; and if no present working current of a load exceeds the OCP threshold, step S707 is turned to.

In one example, the power management device 163 determines whether a present working current of a load exceeds the OCP threshold according to acquired working current of each load. If a present working current of a load exceeds the OCP threshold, step A in FIG. 13 is turned to, and the current of each load is limited within the current-limiting protection current or the current-limiting protection current distribution ratio of the load itself according to example one, such that the total output power of the power supply device 16 reduces to be equal to or less than the OCP threshold. If no present working current of a load exceeds the OCP threshold, step S707 is turned to.

In step S707, according to the sequence of the priority levels of current-limiting protection for the loads, a distribution current of a load on which the current-limiting protection is preferentially performed is calculated.

In one example, based on the received present working current of each load, the power management device 163 calculates the distribution current of the load requiring the current-limiting protection according to the sequence of the priority levels of current-limiting protection for the loads.

In this example, since the priority level of current-limiting protection for the first motor 131 of the mowing unit 13 is superior to the priority level of current-limiting protection for the second motor 143 of the walking unit 14, when the total output current of the power supply device 16 exceeds the OCP threshold, the current of the mowing unit 13 is preferentially limited.

In one example, the distribution current of the first motor 131 is calculated according to the following formula: the distribution current of the first motor 131=the OCP threshold−the present working current of the second motor 143.

In step S708, the current-limiting protection information is generated according to the calculated distribution current of the load.

The current-limiting protection unit 1634 receives the above-mentioned calculated distribution current of the load, generates current-limiting protection information including the distribution current of the load, and transmits the current-limiting protection information to each load.

In step S709, the working current of the load requiring the current-limiting is reduced until the working current of the load is equal to the calculated distribution current of the load.

After receiving the current-limiting protection information transmitted by the current-limiting protection unit 1634, each load correspondingly adjusts the current of each load itself according to the distribution current of the load in the current-limiting protection information.

In this example, the current of the first motor 131 of the mowing unit 13 is preferentially limited, and the distribution current of the first motor 131=the OCP threshold−the present working current of the second motor 143. According to such current distribution rule, the working current of the first motor 131 is reduced to be: the OCP threshold−the present working current of the second motor 143, while the second motor 143 continues to operate at the present working current of the second motor 143.

In step S710, current-limiting protection is terminated.

The current-limiting protection is terminated after the total output current of the power supply device 16 reduces to be equal to or less than the OCP threshold.

Through the above-mentioned examples, when none of the currents of the loads exceeds the OCP threshold, according to the set sequence of the priority levels of current-limiting protection for the loads, the current-limiting is selectively performed on one or more loads according to the sequence of the priority levels from high to low, such that the total output current is reduced to be equal to or less than the OCP threshold. In this way, the power being effectively utilized is ensured and the total output current of the power supply device 16 is within the range of a current-limiting value.

Through the above mode, the defects of example one can be improved.

EXAMPLE THREE

In this example, when the total output current of the power supply device 16 exceeds the OCP threshold and the current-limiting protection is required, the current distribution is dynamically adjusted according to a present current situation of each load, that is, the current-limiting protection current of each load is dynamically adjusted such that the total output current of the power supply device 16 is less than or equal to the OCP threshold. The advantages are described below. When the current-limiting protection current distribution ratio is set to a fixed value, the problem that the electric energy may not be effectively utilized to affect the usability of the riding-type mower 100 and be unfavorable to the working effect of the riding-type mower 100 can be avoided.

In example three, a calculation formula for the distribution current of each load is described below.

A distribution current $I1$ of a first load=a proportion per1 of a present working current of the first load in a total current of all loads*the OCP threshold.

A distribution current $I2$ of a second load=a proportion per2 of a present working current of the second load in the total current of all loads*the OCP threshold.

A distribution current $I3$ of a third load=a proportion per3 of a present working current of the third load in the total current of all loads*the OCP threshold.

A distribution current $In$ of a $n^{th}$ load=a proportion per$n$ of a present working current of the $n^{th}$ load in the total current of all loads*the OCP threshold.

The power output by the power supply device 16 being supplied only to the mowing unit 13 and the walking unit 14 is described as an example. The current of the first motor 131 of the mowing unit 13 and the current of the second motor 143 of the walking unit are distributed as modes described below.

A distribution current of the first motor 131=a present working current of the first motor 131/(the present working current of the first motor 131+a present working current of the second motor 143)*the OCP threshold.

A distribution current of the second motor 143=the present working current of the second motor 143/(the present working current of the first motor 131+the present working current of the second motor 143)*the OCP threshold.

In one example, the calculation formula for the distribution current of each load may further be calculated by using the formula described below.

The distribution current $I1$ of the first load=the proportion per1 of the present working current of the first load in a present total output current of the power supply output device 16*the OCP threshold.

The distribution current $I2$ of the second load=the proportion per2 of the present working current of the second load in the present total output current of the power supply output device 16*the OCP threshold.

The distribution current $I3$ of the third load=the proportion per3 of the present working current of the third load in the present total output current of the power supply output device 16*the OCP threshold.

The distribution current $In$ of the $n^{th}$ load=the proportion per$n$ of the present working current of the $n^{th}$ load in the present total output current of the power supply output device 16*the OCP threshold.

In this way, the current of the first motor 131 of the mowing unit 13 and the current of the second motor 143 of the walking unit are distributed in the mode described below.

The distribution current of the first motor 131=the present working current of the first motor 131/the total output current of the power supply device 16*the OCP threshold.

The distribution current of the second motor 143=the present working current of the second motor 143/the total output current of the power supply device 16*the OCP threshold.

In one example, the wording "present" refers to a moment when the total output current of the power supply device 16 is detected to be greater than the OCP threshold. In this way, according to the proportion of the present working current of each load in the total current of all loads (or the proportion of the present working current of each load in the present total output current of the power supply device 16), the distribution current of each load at a next moment is calculated.

Through such the mode, the current distribution of each load is dynamically adjusted, so that the electric energy or power output by the power supply device 16 can be ensured to be effectively utilized. In one example, the load may further include other loads.

EXAMPLE FOUR

In this example, when the total output current of the power supply device 16 exceeds the OCP threshold and the current-limiting protection is required, a current of each load is gradually reduced according to a preset current reducing step of each load or a current reducing step determined based on present operating conditions (such as light, medium, or heavy) of each load, such that the current of each load is gradually reduced until the total current is equal to or less than the OCP threshold.

For example, when the riding-type mower 100 performs the mowing operation on flat ground, the present operating condition of the mowing unit 13 may be considered as medium or heavy and the present operating condition of the walking unit 14 is light or medium, the current distributed to the mowing unit 13 may be gradually reduced at a smaller current reducing step, while the current distributed to the walking unit 14 is gradually reduced at a larger current reducing step so as to cooperate with the mowing unit 13 to operate, that is, the current reducing step of the mowing unit 13 is less than the current reducing step of the walking unit 14 until the total output current of the power supply device 16 reduces to be equal to or less than the OCP threshold. Similarly, when the riding-type mower 100 is on an uphill slope, the present operating condition of the walking unit 14 may be considered to be heavy, so the current distributed to the walking unit 14 may be gradually reduced at a smaller current reducing step and the current distributed to the mowing unit 13 may be gradually reduced at a larger current reducing step until the total output current of the power supply device 16 reduces to be equal to or less than the OCP threshold.

In one example, the current distribution rule includes steps described below.

The present working condition of each load is determined.

A current reducing step of each load is determined according to the present working condition of each load.

The current of each load is gradually reduced according to the current reducing step of each load itself such that the current of each load is gradually reduced until the total current is equal to or less than the OCP threshold.

Figure 14:
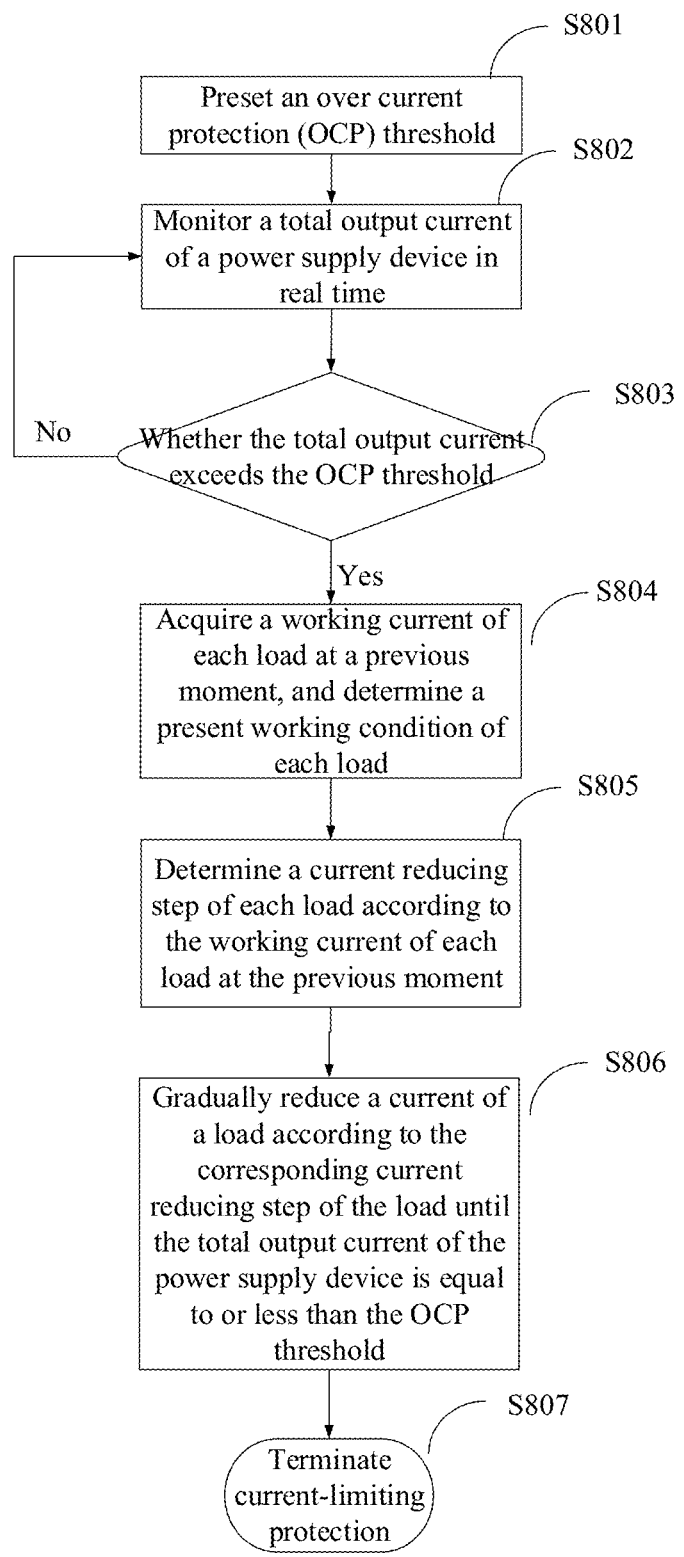
FIG. 14 is a flowchart of a current-limiting protection method of a riding-type mower according to one example of the present application.

In one example, the present working condition of each load is defined by detecting a working current of each load at a previous moment, and a magnitude of the working current of each load at the previous moment exceeding the OCP threshold or the preset current-limiting protection current is calculated to determine the current reducing step of each load. Referring to FIG. 14, according to the current distribution rule of example four, the multi-load current-limiting protection method of the riding-type mower 100 includes steps described below.

In step S801, an OCP threshold is preset.

In one example, the OCP threshold ranges from 80 A to 200 A.

In step S802, a total output current of the power supply device 16 is monitored in real time.

In one example, the total current detection circuit 168 monitors the magnitude of the total current on the discharge loop in real time.

In step S803, whether the total output current of the power supply device 16 exceeds the OCP threshold is determined; if the total output current of the power supply device 16 exceeds the OCP threshold, step S804 is turned to; and if the total output current of the power supply device 16 does not exceed the OCP threshold, step S802 is turned to.

In one example, the controller 1633 of the power management module 163 determines whether the total output current of the power supply device 16 exceeds the OCP threshold; if the total output current of the power supply device 16 exceeds the OCP threshold, step S804 is turned to; and if the total output current of the power supply device 16 does not exceed the OCP threshold, step S802 is turned to.

In S804, a working current of each load at a previous moment is acquired, and a present working condition of each load is determined.

In one example, the current detection current 166 of each load detects the working current of each load at the previous moment. The previous moment herein may be one second before, two seconds before, three seconds before, and so on, and the previous moment is selected by the user according to the specific situation, which is not limited herein. In one example, the present working condition of each load may also be determined by detecting a current of each load at a present moment.

In one example, the controller of each load determines the present working condition of the load according to the detected working current of each load at the previous moment. For example, if it is detected that the working current of the load at the previous moment is greater than or equal to a first preset threshold, the load is considered to be in a heavy load condition; if it is detected that the working current of the load at the previous moment is greater than or equal to a second preset threshold value and less than the first preset threshold value, the load is considered to be in a medium load condition; and if it is detected that the working current of the load at the previous moment is less than the second preset threshold value, the load is considered to be in a light load condition.

In S805, a current reducing step of each load is determined according to the working current of each load at the previous moment.

In one example, the working current of each load at the previous moment is compared with the OCP threshold or the over current protection threshold of each load itself so as to determine whether a magnitude of an exceeded current value is large. For example, when the working current of each load at the previous moment is greater than a preset threshold, if the magnitude of the exceeded current value is large, a large current reducing step is set; and if the magnitude of the exceeded current value is small, a small current reducing step is set.

In one example, if the working current of the load at the previous moment exceeds the OCP threshold by a large amount, the current reducing step of the load is set to a larger step; if the working current of the load at the previous moment exceeds the OCP threshold by a small amount, the current reducing step of the load is set to a smaller step; and the current reducing step of each load is set to zero until the total output current of the power supply device 16 reduces to be equal to or less than the OCP threshold.

In one example, if the working current of the load at the previous moment exceeds the current-limiting protection current (see example one) of each load itself by a large amount, the current reducing step of the load is set to a larger step; if the working current of the load at the previous moment exceeds the current-limiting protection current of each load itself by a small amount, the current reducing step of the load is set to a smaller step; and the current reducing step of each load is set to zero until the total output current of the power supply device 16 reduces to be equal to or less than the OCP threshold.

In one example, the current reducing step of each load may further be preset. When the total output current of the power supply device 16 exceeds the OCP threshold, the current of each load is gradually reduced according to the preset current reducing step such that the current of each load is gradually reduced until the total output current of the power supply device 16 is equal to or less than the OCP threshold.

The current-limiting protection unit 1634 generates the current-limiting protection information including the current reducing step of each load according to the magnitude of the working current of each load at the previous moment exceeding the OCP threshold, and transmits the current reducing step of each load itself to each load.

In S806, a current of a load is gradually reduced according to the corresponding current reducing step of the load until the total output current of the power supply device 16 is equal to or less than the OCP threshold.

Through such the mode, the current of each load is gradually reduced according to the preset current reducing step of each load such that the current of each load is gradually reduced until the total output current of the power supply device 16 is equal to or less than the OCP threshold.

In step S807, current-limiting protection is terminated.

The current-limiting protection is terminated after the total output current of the power supply device 16 reduces to be equal to or less than the OCP threshold. At this time, the current reducing step of each load should be reduced to zero.

In one example, the wording "present" described above refers to a moment when the total output current of the power supply device 16 is greater than the OCP threshold.

In one example, one load of the plurality of loads is designated as a host, a controller of the one load is used as a main control unit, the main control unit can acquire information of each load through the bus, and the information includes present state information, next-step operation state prediction information, and the like. According to such the mode, the main control unit may also be used as the current-limiting protection unit 1634.

Each load includes a controller and a communication unit, and the plurality of loads can exchange information with each other. In this way, each load can know current information of the load itself and other loads so as to better achieve overall current distribution and improve overall efficiency of a system.

Figure 15:
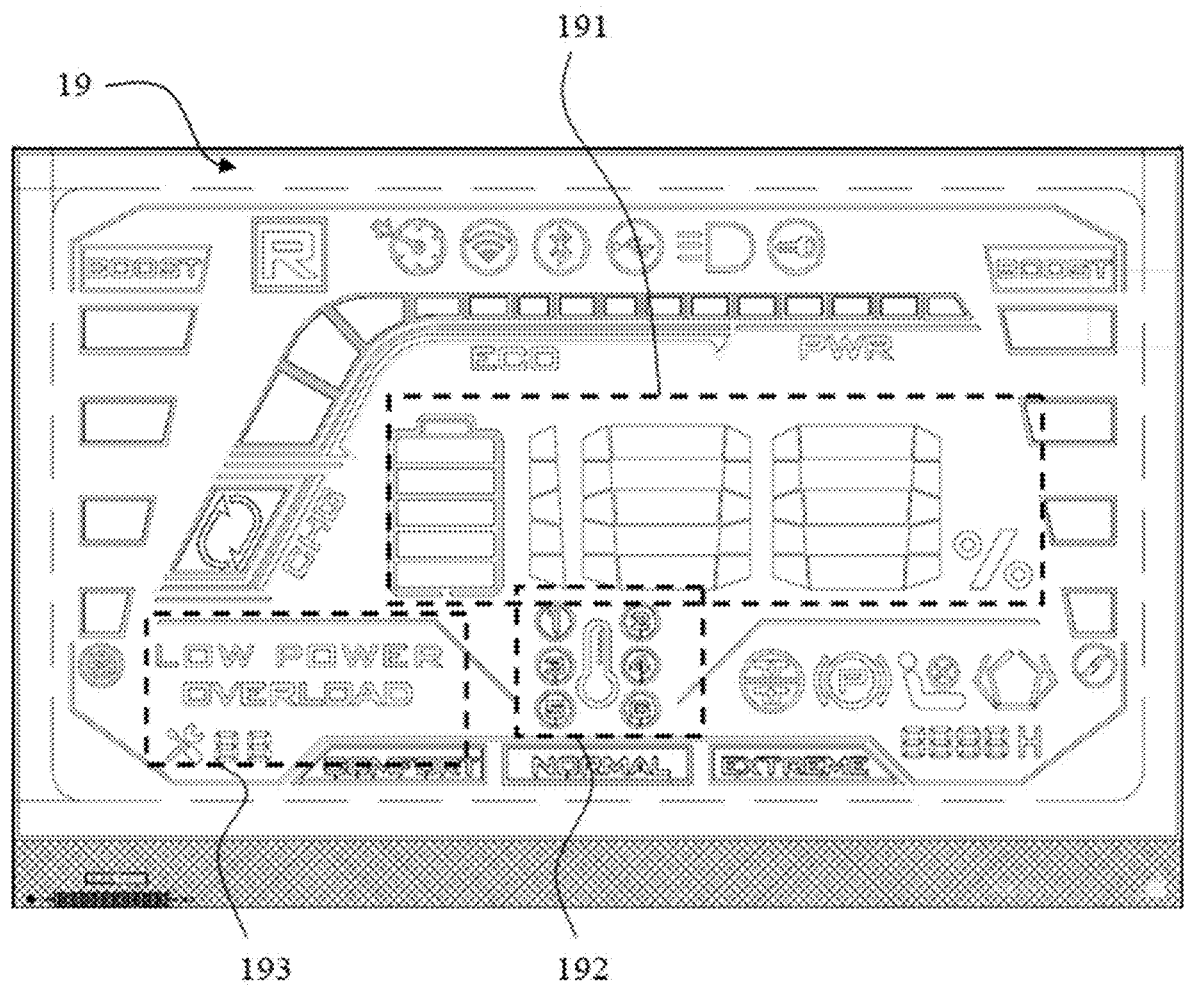
FIG. 15 is a schematic diagram of a display module of a riding-type mower according to one example of the present application.

Referring to FIG. 15, the riding-type mower 100 includes a display module 19, and the display module 19 can display status information of the power supply device 16 of the riding-type mower 100. The status information of the power supply device 16 includes battery capacity information and remaining working time of the power supply device 16, battery capacity information of each battery pack 161 inserted into the battery compartment 162, and the like such that it is convenient for the user to check state of the power supply device 16 and state of the battery pack 161 so as to arrange the subsequent work of the riding-type mower 100.

The display module 19 includes a total battery capacity display unit 191. In one example, a total battery capacity of the power supply device 16 is shown as a percentage. In one example, a fixed total capacity is used as a reference, and a ratio of an actual capacity of the battery pack 161 inserted into the battery compartment 162 to the total capacity is used as present total battery capacity information of the riding-type mower 100. In one example, a sum (that is, the total capacity) of fully charged capacities of all battery packs 161 inserted into the battery compartment 162 is used as a reference, and a ratio of the actual capacities of all battery packs 161 inserted into the battery compartment 162 to the sum of the fully charged capacities of all battery packs 161 is used as the present total battery capacity information of the power supply device 16 and the riding-type mower 100.

The display module 19 further includes a battery compartment status display unit 192. The battery compartment status display unit 192 can display at least a state of the battery compartment 162, and the state of the battery compartment 162 includes whether a battery pack 161 is inserted into the battery compartment 162, whether the battery pack 161 inserted into the battery compartment 162 is in an operating state, and the like. In one example, the battery compartment status display unit 192 includes a status indicator light corresponding to a respective battery compartment 162, and the status indicator light is configured to display the state of the battery compartment 162. When the battery pack 161 in the battery compartment 162 is in the operating state, a status indicator light of a corresponding battery compartment 162 is lighted, where the operating state includes a discharge state and a charge state. In one example, the battery compartment status display unit 192 further includes a battery capacity display indicator light, and the battery capacity display indicator light is configured to display battery capacity information of the battery pack 161 in each battery compartment 162. One battery capacity display indicator light is provided. The state of each battery compartment 162 and the battery capacity information of the battery pack 161 in the battery compartment 162 are alternately displayed through a combination of the status indicator light and the battery capacity display indicator light corresponding to the respective battery compartment 162. In this way, not only the number of indicator lights is reduced and the cost is saved, but also a display interface of the display module 19 is more compact, thereby simplifying the design.

In one example, the display module 19 further includes a remaining working time display unit, and the remaining working time display unit is configured to display remaining working time of the power supply device 16. The remaining working time of the power supply device 16 is set at least according to the operating state of the first motor 131 of the mowing unit 13 or the operating state of the second motor 143 of the walking unit 14, or according to the operating states of both the first motor 131 and the second motor 143.

In one example, the remaining working time display unit displays the remaining working time of the power supply device 16 and the remaining working time of the load corresponding to the selected load condition in different load selections, such that it is convenient for the user to view and arrange subsequent work. For example, when the mowing unit 13 is selected, that is, the first motor 131 of the mowing unit is selected as the load, and the remaining working time display unit displays the remaining working time of the riding-type mower 100 for mowing. When the walking unit 14 is selected, that is, the second motor 143 is selected as the load, the remaining working time display unit displays the remaining working time of the riding-type mower 100 for walking. When the mowing unit 13 and the walking unit 14 are selected, that is, the first motor 131 and the second motor 143 are selected as loads, the remaining working time display unit displays the total remaining working time of the riding-type mower 100 for walking and mowing at the same time.

In one example, the display module 19 further includes an abnormal status alarm region 193, and the abnormal status alarm region 193 is configured to display an abnormal state of the power supply device 16 and transmit alarm information to alert the user. For example, the abnormal state of the power supply device 16 may be that the battery capacity is insufficient, the battery pack 161 is unbalanced, or the battery pack 161 is overheated, or the like.

In one example, each battery pack 161 inserted into the power supply device 16 has an independent display interface, each display interface can display the battery capacity state of each battery pack 161, and the user can view the state of each battery pack 161 through the display interface. The state includes the battery capacity information of the battery pack 161.

What is claimed is:
1. A riding-type mower, comprising:
a body frame;
a seat disposed on the body frame;
a mowing unit, comprising a mowing element and a first motor configured to drive the mowing element;
a walking unit, comprising a road wheel and a second motor configured to drive the road wheel; and
a power supply device mounted on the body frame, wherein the power supply device comprises:
a plurality of battery packs configured to supply power to the riding-type mower, wherein at least one of the plurality of battery packs is detachably mounted to the riding-type mower and further configured to supply power to a hand-held electric power tool, the plurality of battery packs each are provided with at least one battery cell group, and each battery cell group comprises a plurality of battery cells electrically connected to each other; and
a power management module configured to determine whether the plurality of battery packs satisfy a discharge condition and control a battery pack satisfying the discharge condition to discharge when the battery pack satisfies the discharge condition;
wherein the discharge condition comprises that a sum of numbers of respective battery cell groups of all the plurality of battery packs connected in parallel is greater than or equal to 5.

2. The riding-type mower of claim 1, wherein a rated voltage of each of the plurality of battery cell groups is equal.

3. The riding-type mower of claim 2, wherein the plurality of battery cell groups each have a same number of battery cells.

4. The riding-type mower of claim 1, wherein the power management module is further configured to group the battery packs where the voltage difference between the battery packs is within the preset range into one battery pack unit and enable battery pack units to sequentially discharge according to a voltage level sequence of the battery pack units from highest to lowest until all the battery pack units jointly discharge finally.

5. The riding-type mower of claim 1, wherein the power management module is further configured to enable the plurality of battery packs to sequentially discharge according to a voltage level sequence of the plurality of battery packs from highest to lowest until all the plurality of battery packs jointly discharge finally.

6. The riding-type mower of claim 1, wherein the power supply device comprises a first battery pack circuit and a second battery pack circuit which are disposed in parallel, the first battery pack circuit comprises a first battery pack, the second battery pack circuit comprises a second battery pack, the power management module is configured to acquire a voltage of the first battery pack and a voltage of the second battery pack and determine whether a difference between the voltage of the first battery pack and the voltage of the second battery pack is within a preset range, and the power management module is configured to, in condition that the difference between the voltage of the first battery pack and the voltage of the second battery pack is within the preset range, control the first battery pack and the second battery pack to jointly discharge and, in condition that the difference between the voltage of the first battery pack and the voltage of the second battery pack exceeds the preset range, control a battery pack with a higher voltage between the first battery pack and the second battery pack to discharge first until the difference between the voltage of the first battery pack and the voltage of the second battery pack is within the preset range and then, in response to the difference between the voltage of the first battery pack and the voltage of the second battery pack being within the preset range, control the first battery pack and the second battery pack to jointly discharge.

7. The riding-type mower of claim 1, wherein the power supply device comprises a plurality of battery pack circuits disposed in parallel, the plurality of battery pack circuits each comprise a battery pack, a discharge metal oxide semiconductor (MOS) tube, and a charging MOS tube, the battery pack, the discharge metal oxide semiconductor (MOS) tube, and the charging MOS tube are connected in series, the discharge MOS tube is configured to control the battery pack to discharge, the charging MOS tube is configured to control the battery pack to charge, the discharge MOS tube and the charging MOS tube are connected in series, the discharge MOS tube and the charging MOS tube each comprise a parasitic diode, the power management module is configured to enable each charging MOS tube in the plurality of battery pack circuits to be turned on, enable a discharge MOS tube in a battery pack circuit where a battery pack with a highest voltage is located to be turned on, and, in condition that a current of any one of the plurality of battery pack circuits is greater than a first preset current threshold, control a discharge MOS tube in the one battery pack circuit to be turned on, so as to enable the battery pack with the highest voltage and a battery pack of a battery pack circuit where a current of the battery pack circuit is greater than the first preset current threshold to jointly discharge, and a value of the first preset current threshold ranges from 0 A to 3 A.

8. The riding-type mower of claim 7, wherein the power management module is further configured to, in condition that a current of any one of the plurality of battery pack circuits except the battery pack circuit where the battery pack with the highest voltage is located is less than a second preset current threshold, control a discharge MOS tube in the one battery pack circuit to be turned off, and a value of the second preset current threshold ranges from 0 A to 3 A.

9. The riding-type mower of claim 8, further comprising a total current detection circuit, wherein the total current detection circuit is configured to detect a current in a total current loop output by the power supply device and the power management module is configured to, in a discharge process of the power supply device, after a total current is detected to be less than a third preset current threshold, enable a charging MOS tube and a discharge MOS tube in a battery pack circuit where a battery pack with a lowest voltage is located to be turned on, and enable charging MOS tubes and discharge MOS tubes in the plurality of battery pack circuits except the battery pack circuit where the battery pack with the lowest voltage is located to be turned off.

10. The riding-type mower of claim 9, wherein a value of the third preset current threshold ranges from −3 A to 0 A.

11. The riding-type mower of claim 1, wherein the power management module is configured to, in condition that a discharge current of any one of the plurality of battery packs is greater than a preset current threshold, control the one battery pack to stop discharging.

12. The riding-type mower of claim 1, wherein the power management module is configured to, in condition that a voltage difference between any two battery cells in any one of the plurality of battery packs is greater than a preset voltage threshold, control the one battery pack to stop discharging.

13. The riding-type mower of claim 1, wherein the discharge condition further comprises that a temperature of the battery pack is less than a preset temperature threshold.

14. The riding-type mower of claim 13, wherein the power management module is adapted to, in condition that the temperature of the battery pack is greater than or equal to the preset temperature threshold, control the battery pack to discharge after waiting for the temperature of the battery pack being changed to be less than the preset temperature threshold.

15. The riding-type mower of claim 1, wherein a value of discharge power of the power supply device ranges from 2 KW to 4 KW.

16. The riding-type mower of claim 1, wherein a value of discharge power of the battery pack ranges from 500 W to 6500 W.

17. The riding-type mower of claim 1, wherein a capacity of the battery pack is greater than or equal to 130 Wh and less than or equal to 1000 Wh.

18. The riding-type mower of claim 1, wherein a weight of the battery pack is less than or equal to 4 KG.

19. The riding-type mower of claim 1, wherein a number of the plurality of battery packs in the power supply device is greater than or equal to 4 and less than or equal to 10.

20. The riding-type mower of claim 1, further comprising a current-limiting protection unit, wherein the current-limiting protection unit is configured to coordinate and distribute a current flowing to each of loads so as to enable a total output current of the power supply device to be less than or equal to an over current protection threshold.

* * * * *